March 12, 1963 A. L. LEE ETAL 3,080,773
CONSTANT MESH TRANSMISSION AND HYDRAULIC
ACTUATING CIRCUIT THEREFOR
Filed Feb. 26, 1960 6 Sheets-Sheet 1

INVENTORS
ARTHUR L. LEE
ARTHUR B. COVAL
BY
ATTORNEY

INVENTORS
ARTHUR L. LEE
ARTHUR B. COVAL
BY
ATTORNEY

March 12, 1963 A. L. LEE ETAL 3,080,773
CONSTANT MESH TRANSMISSION AND HYDRAULIC
ACTUATING CIRCUIT THEREFOR
Filed Feb. 26, 1960 6 Sheets-Sheet 5

INVENTORS.
ARTHUR L. LEE
ARTHUR B. COVAL
BY
THEIR ATTORNEY

INVENTORS.
ARTHUR L. LEE
ARTHUR B. COVAL
BY Stanley J. Price
THEIR ATTORNEY

United States Patent Office 3,080,773
Patented Mar. 12, 1963

3,080,773
CONSTANT MESH TRANSMISSION AND HYDRAU-
LIC ACTUATING CIRCUIT THEREFOR
Arthur L. Lee and Arthur B. Coval, Columbus, Ohio,
assignors to Consolidation Coal Company, Pittsburgh,
Pa., a corporation of Pennsylvania
Filed Feb. 26, 1960, Ser. No. 11,348
14 Claims. (Cl. 74—732)

This invention relates to a hydraulic actuating circuit, and more particularly to a constant mesh transmission having a plurality of speed ratios and a variable pressure actuating circuit to effect transmission shifting from one speed ratio to another.

This application is a continuation-in-part of our co-pending United States patent application Serial No. 734,-168, filed May 9, 1958, now abandoned, and discloses, in many of its particulars, an invention that is an improvement of the hydraulically controlled transmission disclosed in United States Reissue Patent No. 24,327, dated June 11, 1957, issued to A. L. Lee.

The transmission shown and described in the above named patent has three speed ratios in the forward direction and three speed ratios in the reverse direction. This speed arrangement has proven very satisfactory in haulage type vehicles that are employed in shuttle type haulage work. The present transmission is an improvement of the above named transmission in that an additional speed ratio is added in each direction of the transmission, thereby providing a transmission that is suitable for heavy duty haulage under steep grade conditions wherein an additional gear ratio is required to provide efficient operation of the vehicle. Although we have added an additional speed in each direction to the transmission disclosed in Reissue Patent No. 24,327, it should be noted that the other meritorius features such as the constant mesh spur type gearing and the external clutches, taught by the above named patent, are still retained in this improved transmission.

In addition to the provision of an additional speed ratio in each direction of transmission operation, the basic transmission has been improved by the provision of a variable pressure hydraulic actuating circuit. The transmission mechanism of the present invention has a plurality of hydraulically actuated clutches which are sequentially engaged to provide alternate drive connections between the transmission input shaft and the output shaft to effect the various transmission speed ratios. The variable pressure hydraulic actuating circuit of the present invention varies the pressure of the fluid which actuates the hydraulic clutches of the transmission in accordance with the torque being transferred through the transmission clutches. Throughout this specification, reference will be made to the actuation of the hydraulic clutches. The term "actuation" is intended to encompass the conducting of pressurized fluid to the clutches and the maintenance of pressurized fluid therein to engage the clutch. When the clutch is deactuated, the fluid pressure is vented from the clutch and it is disengaged.

The hydraulic pressure applied to actuate a hydraulic clutch and maintain it in an engaged position should bear a functional relation to the magnitude of the torque to be transferred by the clutch. If the hydraulic pressure is disproportionately lower than the torque to be transferred, the clutch will not be engaged with sufficient force to prevent clutch slippage and the full magnitude of the torque will not be transferred through the clutch. If, on the other hand, the hydraulic pressure is disproportionately greater than the value of the torque to be transferred, the clutch will be engaged with excessive force and speed that results in a shock load being transmitted through the transmission. This shock load can result in damage to the transmission and/or the clutch. Further, the excessive force of the hydraulic pressure applied to the clutch in such a situation can cause the clutch to stick in the engaged position so that even when the fluid is vented to release it, it remains engaged or partially engaged and disrupts the efficient operation of the transmission.

To provide smooth shifting of the transmission from one speed ratio to another, the transmission clutches should be actuated by fluid at pressures that are sufficient to maintain the clutches in engagement without clutch slippage, but at pressures no greater than necessary to prevent clutch slippage since excessive actuating pressures result in shock loads that cause rough transmission shifting. The present invention contemplates an actuating circuit which provides clutch actuating fluid at variable pressures. The pressure is varied in accordance with the input torque to the transmission so that when a greater torque is to be transferred through the transmission clutches, the actuating pressure is increased. When the transmission input torque is decreased, the clutch actuating pressure is correspondingly decreased. A minimum actuating pressure is provided below which the pressure may not decrease even though the transmission input torque may be still further reduced.

The present invention contemplates the provision of a hydro-kinetic torque converter between the vehicle prime mover and the transmission input shaft to multiply the torque input to the transmission from the prime mover. The hydro-kinetic torque converter includes the conventional converter impeller member to circulate fluid in a continuous toroidal fluid circuit. The toroidal fluid circut also includes a converter turbine member and a stator or reaction member. In conventional fashion, the circulating fluid reacts upon the stator member and induces a driving torque upon the turbine member. Under most conditions, the torque induced on the turbine member exceeds in magnitude the driving torque on the converter impeller member.

As is well known in the torque converter art, the magnitude of the torque induced upon the converter turbine member is a function of the relative speeds of the converter impeller and turbine members. When, for example, the speed of the impeller member greatly exceeds that of the turbine member, such as when the turbine is stationary and the impeller is rotating rapidly, maximum torque multiplication occurs and the torque induced upon the turbine member may be two to three times as great as the impeller driving torque. When, on the other hand, the speeds of the turbine and impeller members are nearly equal, the torque multiplication is much less and the torque induced upon the turbine may not even be as great in magnitude as the impeller driving torque.

The present invention utilizes the functional relation between the relative speeds of the torque converter impeller and turbine members and the torque multiplication occurring in the converter to adjust the transmission clutch actuating pressure in the variable pressure hydraulic actuating circuit. A differentially driven positive displacement pump is utilized to provide the primary source of pressurized fluid for the actuating circuit. This pump, which will be termed a differential pump, has two members which are driven to rotate relative to each other. When the two members are driven to rotate at the same speed, the volumetric output of the pump is zero. When, on the other hand, the two members rotate at different speeds, the volumetric output of the pump increases as the differential in speed between the two members increases.

In the present invention, the driven members of the differential pump are driven by the torque converter impeller and turbine members respectively. Thus, when the difference in speed between the torque converter impeller and turbine members is greatest, the torque converter produces maximum torque multiplication, and the differential pump produces a maximum volumetric output of fluid. When the difference in speed between the torque converter members is a minimum, torque multiplication through the converter is a minimum, and the volumetric output of the differential pump is a minimum.

The volumetric output of the differential pump is conducted through the variable pressure actuating circuit. A portion of the actuating circuit produces an "orifice effect" and causes a pressure variation in the remainder of the circuit. The term "orifice effect" is utilized to designate the effect created by a partial restriction of the actuating circuit which causes the pressure in the circuit upstream of the restriction to increase as an exponential function of the volumetric rate of flow through the restriction. The "orifice effect" in the present invention is created by a combination of an orifice valve and the tortuous fluid passages in a portion of the circuit. It will be appreciated that either one of these means alone may produce a sufficient "orifice effect" in a given construction to practice the instant invention.

Having an "orifice effect" in a portion of the actuating circuit, the present invention utilizes the varying pressure upstream of the orifice restriction to actuate the clutches of the transmission. Since the volumetric output of the differential pump increases with increased torque multiplication through the torque converter, the pressure upstream of the orifice will also increase since it depends upon the volumetric rate of flow through the orifice from the differential pump. When the torque multiplication through the torque converter is reduced, the volumetric output of the differential pump is reduced, and the clutch actuating pressure upstream of the orifice is reduced.

In the present invention, a portion of the hydraulic actuating circuit which produces the "orifice effect" is utilized to provide make-up fluid to the torque converter toroidal flow circuit. This make-up fluid is circulated to assist in cooling the torque converter and to prevent cavitation within the toroidal flow circuit. Because the differential pump provides the primary source of pressurized fluid for the circuit, the volume of make-up fluid passed through the toroidal flow circuit increases as the torque multiplication through the converter increases. It is at high torque multiplication that the maximum make-up fluid is required through the torque converter toroidal flow circuit.

With the foregoing considerations in mind, it is a principal object of the present invention to provide a combination of an improved constant mesh transmission and a variable pressure hydraulic actuating circuit to effect shifting of the transmission from one speed ratio to another.

Another object of the present invention is to provide a transmission compact in structure having four speed ratios in one direction of operation and four speed ratios in the other direction of operation.

Another object of this invention is to provide a variable pressure transmission actuating circuit which is adapted to vary the transmission clutch actuating pressure in accordance with the input torque to the transmission.

Another object of this invention is to provide a novel combination of a constant mesh transmission, a hydro-kinetic torque converter, and a variable pressure transmission actuating circuit in which the actuating circuit supplies make-up fluid to the torque converter and variable pressure actuating pressure to the transmission clutches in accordance with the torque multiplication occurring in the torque converter.

Another object of this invention is to provide a transmission for use with heavy duty shuttle type vehicles.

A further object of this invention is to provide a transmission having a plurality of speeds in both directions that is easy to fabricate, assemble, install and maintain.

These and other objects of this invention will become apparent as the description of the invention proceeds in conjunction with the accompanying drawings.

Figure 1:
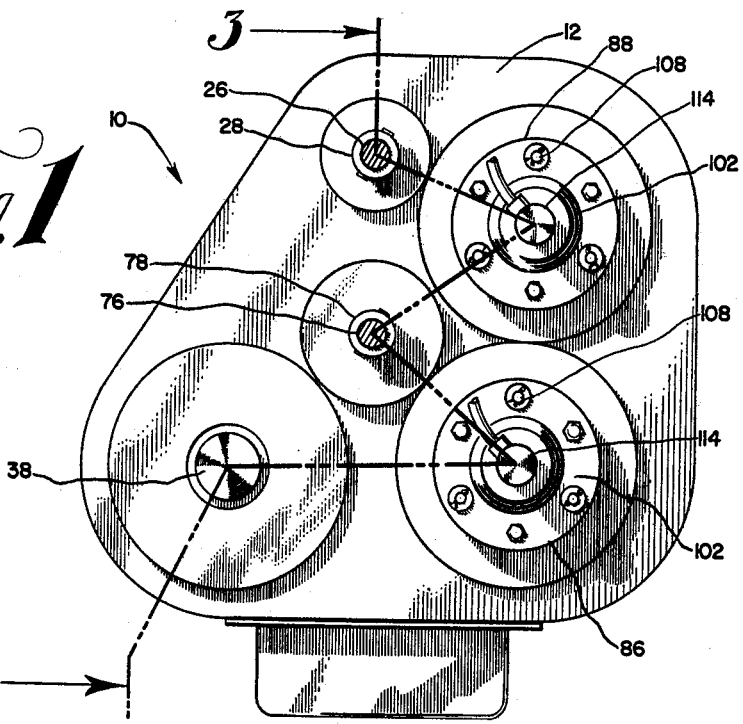
FIGURE 1 is an end elevational view of a preferred illustrative form of the improved transmission mechanism not having the transmission control circuit installed thereon.
Figure 2:
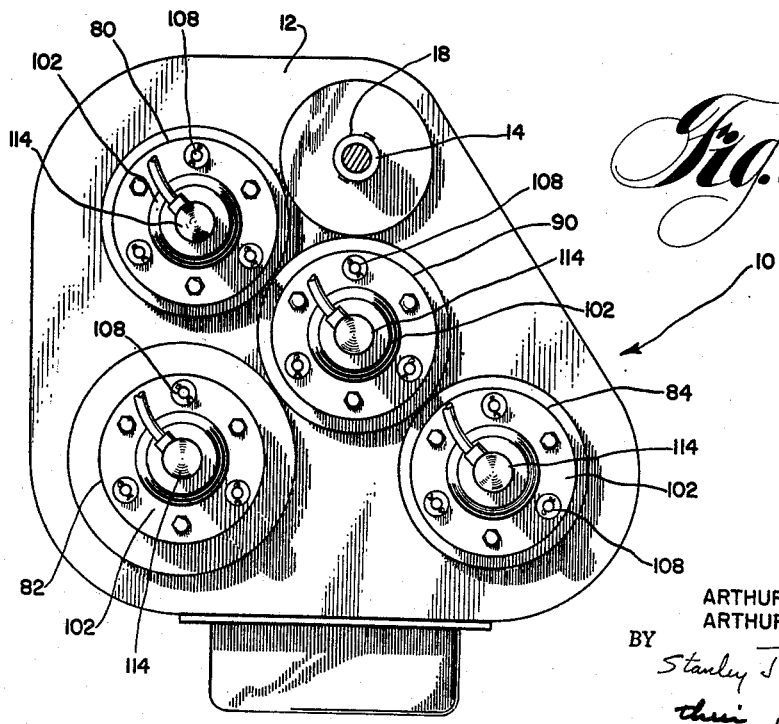
FIGURE 2 is an end elevational view looking toward the opposite end of the transmission mechanism from that illustrated in FIGURE 1.
Figure 3:
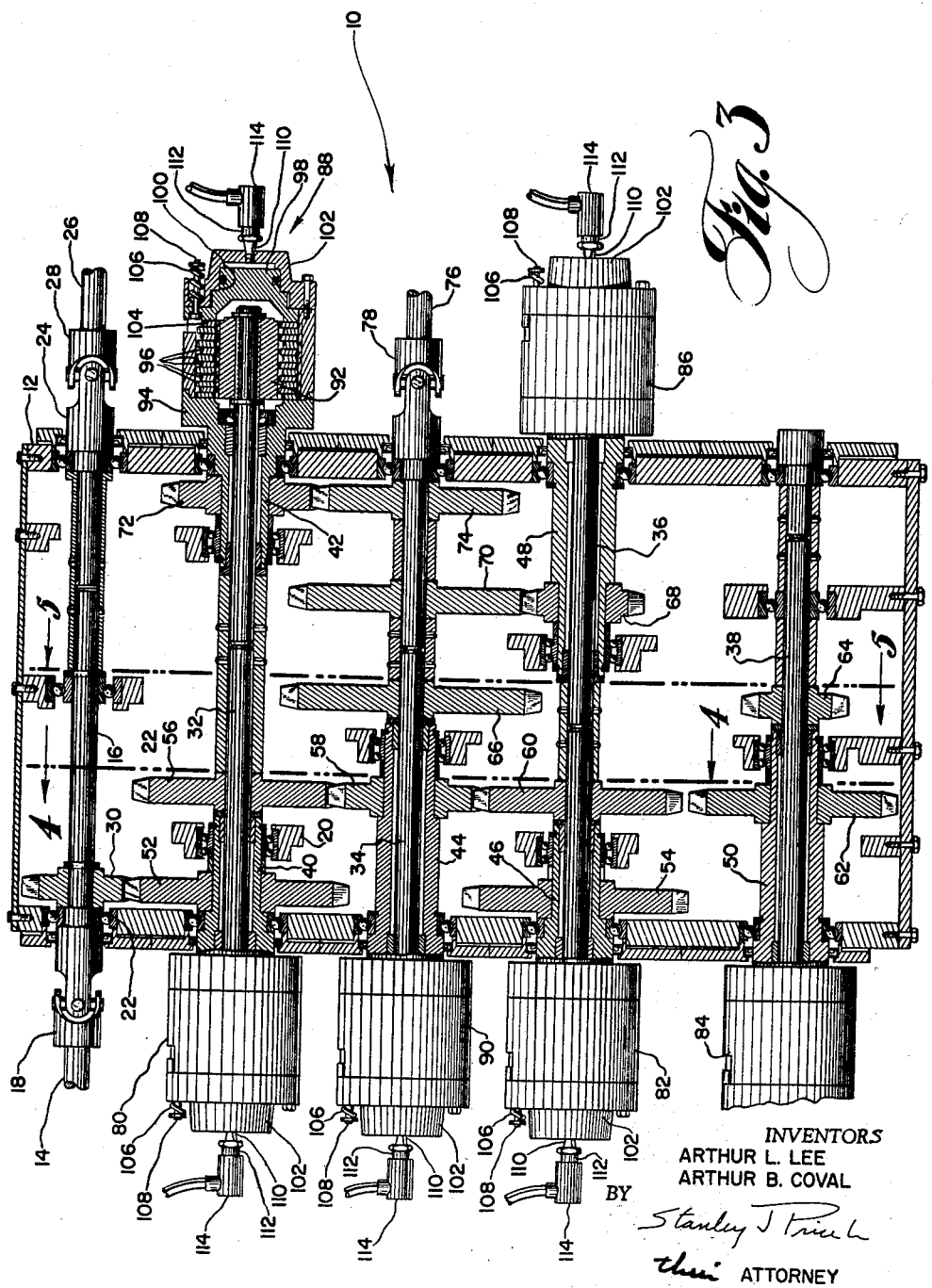
FIGURE 3 is a developed longitudinal section taken substantially on the planes of line 3—3 of FIGURE 1 illustrating the transmission gears, shafts and associated clutches.
Figure 4:
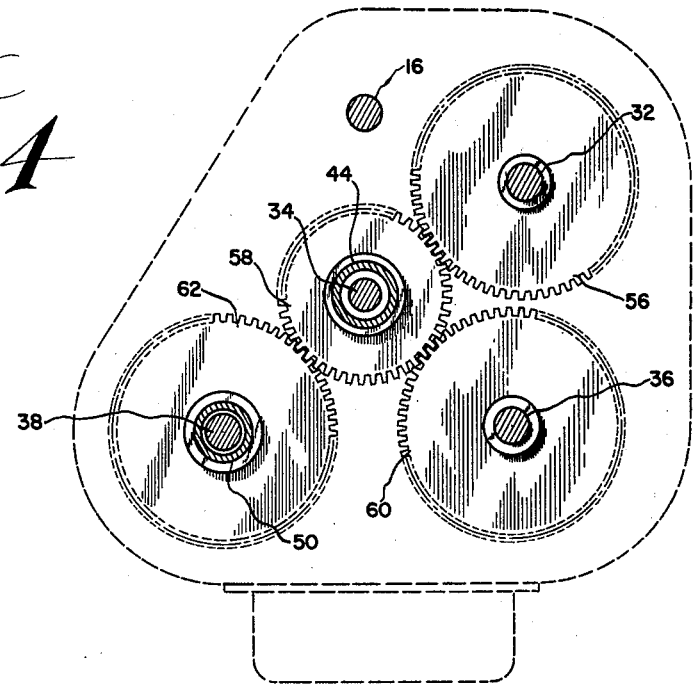
Figure 5:
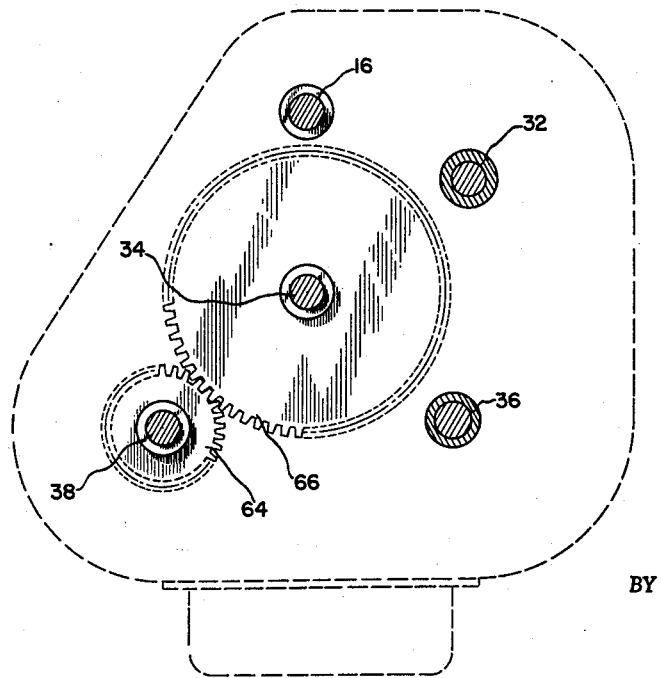

FIGURES 4 and 5 are cross sectional views taken substantially along the lines 4—4 and 5—5 respectively of FIGURE 3.

Figure 6:
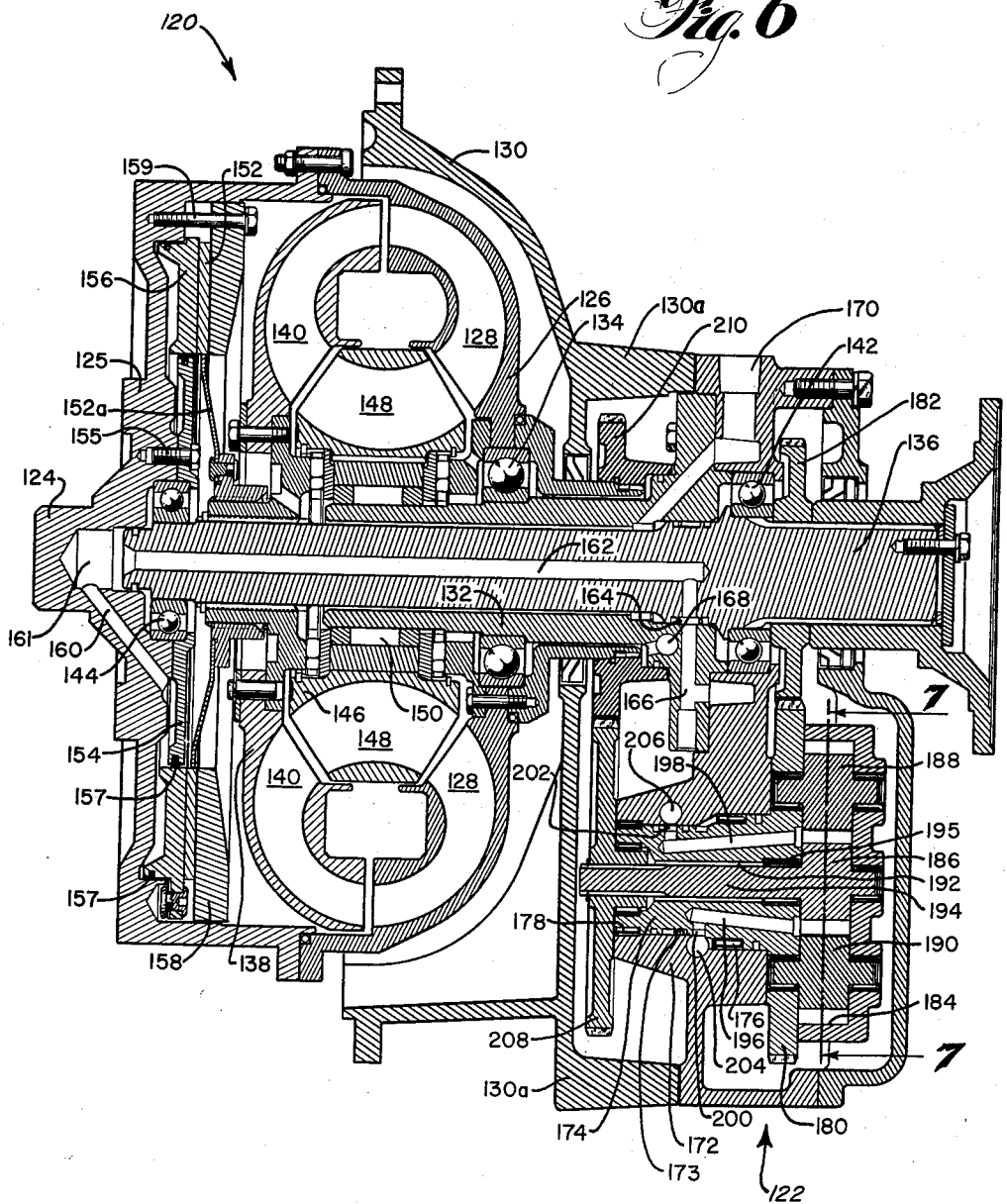

FIGURE 6 is a longitudinal sectional view of the hydro-kinetic torque converter and differentially driven positive displacement pump utilized in the present invention.

Figure 7:
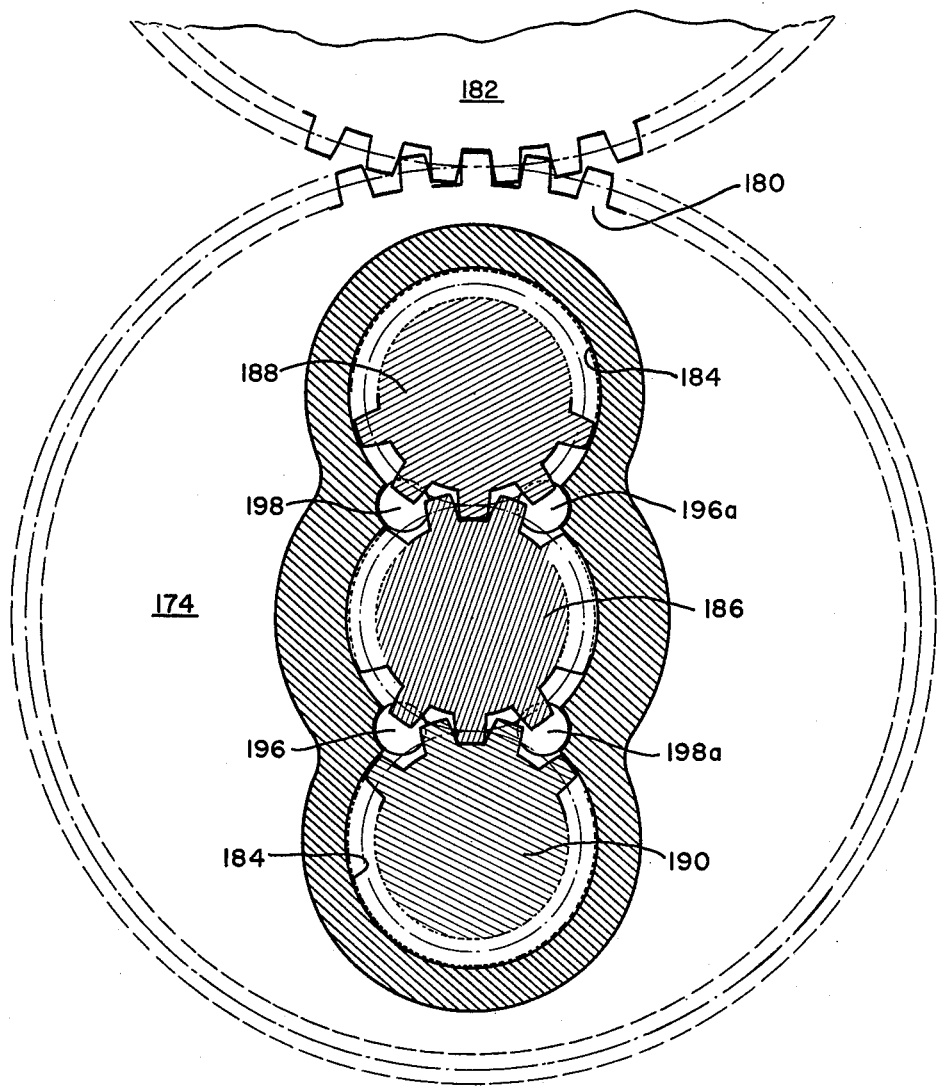

FIGURE 7 is a sectional view taken along line 7—7 of FIGURE 6 showing certain details of construction of the differential pump.

Figure 8:
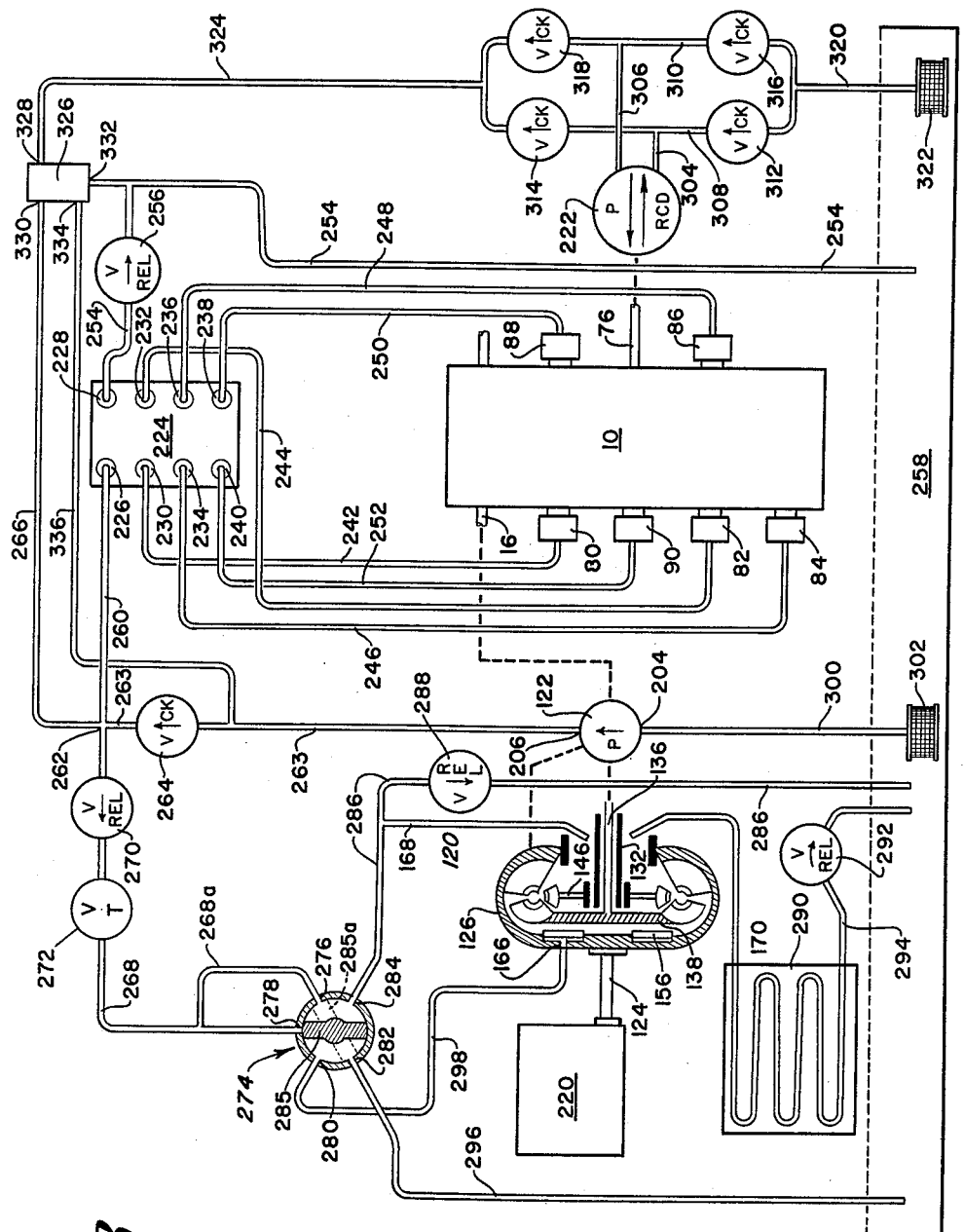

FIGURE 8 is a schematic drawing of the transmission of FIGURES 1–5 and the torque converter of FIGURES 6 and 7 with the variable pressure hydraulic actuating circuit installed thereon.

In the drawings, like reference characters refer to similar elements of the invention throughout all figures of the drawings. To facilitate description of the invention, the improved transmission mechanism will first be described in detail without the torque converter and variable pressure actuating circuit connected thereto. This detailed description will refer particularly to FIGURES 1–5 of the drawings. The construction of the torque converter and differential pump will then be described with particular reference to FIGURES 6 and 7 of the drawings. Finally, the novel combination of the transmission mechanism, torque converter, differential pump, and variable pressure hydraulic actuating circuit will be described with particular reference to FIGURE 8 of the drawings.

TRANSMISSION MECHANISM

Referring to FIGURE 3, the improved transmission generally designated by the numeral 10 has a housing 12 adapted to contain a lubricant bath. A prime mover 220 drives a propeller shaft 14 which is connected to an input shaft 16 by means of a universal connection 18. The input shaft 16 is journaled in the housing side walls and extends through an aperture in an inner partition 20. Roller bearings 22 are provided to carry the input shaft 16. A portion 24 of the input shaft 16 extends through the side wall of housing 12 and is connected to an auxiliary output shaft 26 by means of a universal connection 28. A spur gear 30 is splined or otherwise non-rotatably secured to input shaft 16 within the housing 12. Four countershafts 32, 34, 36 and 38 are journaled in the housing 12 in spaced parallel relation to each other for rotation therein and each has its end portions extending through the side walls of the housing 12. The countershaft 32 has a pair of tubular shafts 40 and 42 arranged coaxially thereon in rotatable relation thereto. The countershaft 34 has a tubular shaft 44 coaxially arranged thereon in rotatable relation thereto. The third countershaft 36 has a pair of tubular shafts 46 and 48 arranged coaxially thereon in rotatable relation thereto. The fourth countershaft 38 has a tubular shaft 50 arranged coaxially thereon in rotatable relation thereto. Each of the tubular shafts 40, 42, 44, 46, 48 and 50 has an end portion extending beyond a side wall of the housing 12. The side walls of the housing 12 have roller bearings 22 positioned therein to suitably support the respective tubular shafts. Within the housing 12 there are a plurality of inner partitions 20 having apertures therethrough which also carry roller bearings 22 to rotatably support the respective shafts.

A directional spur gear 52 is nonrotatably secured to tubular shaft 40 and is in meshing relation with spur gear 30 that is driven by input shaft 16. Another directional gear 54 is nonrotatably secured to tubular shaft 46 coaxially positioned on the third countershaft 36. Directional gear 54 is in meshing relation with directional gear 52. The first countershaft 32 has a connecting spur gear 56 secured thereto and rotatable therewith. The tubular shaft 44 rotatably positioned on second countershaft 34 has a connecting spur gear 58 nonrotatably secured thereto. The spur gear 58 is in meshing relation with connecting spur gear 56. The third countershaft 36 has a connecting spur gear 60 secured thereto and rotatable therewith. The spur gear 60 is in meshing relation with connecting spur gear 58. Tubular shaft 50 coaxially positioned on the fourth countershaft 38 has a spur gear 62 nonrotatably secured thereto. The spur gear 62 meshes with connecting spur gear 58 secured to tubular shaft 44. The arrangement of spur gears 56, 58, 60, and 62 is such that upon actuation of one of the above named spur gears the remainder of the spur gears and the shafts to which they are secured are also actuated.

The fourth countershaft 38 has a change speed spur gear 64 secured thereto and rotatable therewith. The change speed spur gear 64 meshes with a spur gear 66 that is nonrotatably secured to second countershaft 34. Another change speed spur gear 68 is nonrotatably secured to tubular shaft 48 coaxially arranged on the third countershaft 36. Change speed spur gear 68 meshes with a spur gear 70 nonrotatably secured to the second countershaft 34. A third change speed spur gear 72 is nonrotatably secured to tubular shaft 42 coaxially arranged on first countershaft 32. The change speed spur gear 72 meshes with a spur gear 74 nonrotatably secured to second countershaft 34.

A portion of second countershaft 34 extends through the side wall of housing 12 and is connected to an output shaft 76 by means of a universal coupling 78. Thus, rotation of second countershaft 34 is transmitted through the universal coupling 78 to output shaft 76.

Arranged exteriorly of the housing 12 there are the following clutches.

Directional Clutches 80, forward directional clutch which is arranged to frictionally engage tubular shaft 40 to first countershaft 32.
82, reverse directional clutch which is arranged to frictionally engage tubular shaft 46 to third countershaft 36.

Change Speed Clutches 84, first speed clutch which is arranged to frictionally engage tubular shaft 50 to fourth countershaft 38.
86, second speed clutch which is arranged to frictionally engage tubular shaft 48 to third countershaft 36.
88, third speed clutch which is arranged to frictionally engage tubular shaft 42 to first countershaft 32.
90, fourth speed clutch which is arranged to frictionally engage tubular shaft 44 to second countershaft 34.

The above enumerated clutches are of the hydraulically operated multi-disc type and are arranged exteriorly of the transmission housing 12 for ready accessibility. For illustration the third speed clutch 88 is shown in section in FIGURE 3. Each clutch includes an inner member 92 keyed to the countershaft, which in the section illustrated is countershaft 32, and an outer rotatable clutch housing 94 which is secured to the tubular shaft 42. The inner member 92 and the housing or casing 94 carry interleaved clutch discs or plates 96 which when pressed together serve to frictionally engage the countershaft to the tubular shaft for rotation together. A piston 98 is received in the cylinder bore 100 formed within an end enclosure 102 of the outer rotatable clutch housing 94. The piston 98 has a clutch operating portion 104 which abuts the discs 96 and is adapted to move the discs into a clutch engaged position. The piston 98 is normally held in a retracted or clutch disengaged position by means of the springs 106 which act on the bolts 108. The cylinder end enclosure 102 has an element 110 of a conventional fluid swivel 112 connected therethrough, and an outer element 114 of the swivel is coupled to a fluid conduit. The fluid conduit and swivel coupling 110 is arranged to supply fluid under pressure to the cylinder bore 100. The fluid pressure moves the piston 98 until the clutch operating portion 104 moves the clutch discs 96 into frictional engagement. In the absence of fluid under pressure within the cylinder bore 100 the springs 106 retract the piston 98 and release the interleaved clutch disc 96.

The above details of clutch 88 are set forth for illustrative purposes only. It should be understood that other types of clutches could be used with equal facility and the specific clutch construction does not form a part of this invention.

OPERATION OF TRANSMISSION MECHANISM

The transmission illustrated in FIGURE 3 is capable of providing four speeds in the forward direction and four speeds in the reverse direction. The rotation of input shaft 16 drives spur gear 30 which in turn drives directional gears 52 and 54. The spur gears 52 and 54 are respectively connected to tubular shaft 40 and 46 and thereby drive the same. Selective actuation of either forward directional clutch 80 or reverse directional clutch 82 engages the appropriate tubular shaft 40 or 42 to the respective countershafts 32 or 36 which extend axially therethrough. Upon engagement of either of the directional clutch 80 or 82 the first and third countershafts 32 and 36 are driven in a predetermined direction. The connecting spur gears 56 and 60 through their meshing relation with spur gears 58 and 62 in turn drive tubular shafts 44 and 50. In this manner predetermined direction of rotation is provided to elements of the change speed clutches 84, 86, 88 and 90. It should be noted while the first and third countershafts 32 and 36 are active and rotating, countershafts 34 and 38 are inactive until a given change speed clutch is engaged. To provide for rotation of output shaft 76 at a predetermined speed one of the above enumerated change speed clutches must be engaged.

The various clutch engagements required and the various gearing steps in the direction and speed ratio are as follows.

Forward First Speed

CLUTCHES ENGAGED—80 AND 84

Power from input shaft 16 is transmitted through spur gear 30 to directional gears 52 and 54. Engagement of forward directional clutch 80 transmits rotation from tubular shaft 40 to first countershaft 32 to activate connecting gears 56, 58, 60 and 62. Spur gear 62 being secured to tubular shaft 50 rotates the same. First change speed clutch 84 being engaged transmits rotation from tubular shaft 50 to fourth countershaft 38. Spur gear 64 secured to countershaft 38 transmits rotation to spur gear 66 and second countershaft 34 and thence to universal connection 78 and output shaft 76 in forward first speed.

Forward Second Speed

CLUTCHES ENGAGED—80 AND 86

Power is transmitted through the following gears, shafts and clutches: input shaft 16, spur gears 30 and 52, tubular shaft 40, forward directional clutch 80, first countershaft 32, connecting gears 56, 58 and 60, third countershaft 36, second speed clutch 86, tubular shaft 48, change speed spur gear 68, and spur gear 70 to second countershaft 34 and thence through universal connection 78 to output shaft 76 in forward direction second speed.

Forward Third Speed

CLUTCHES ENGAGED—80 AND 88

Power is transmitted through the following gears, shafts and clutches: input shaft 16, spur gears 30 and 52, tubular shaft 40, forward directional clutch 80, first countershaft 32, third speed clutch 88, tubular shaft 42, spur gears 72 and 74, second countershaft 34 and thence through universal connection 78 to output shaft 76 in forward direction third speed.

Forward Fourth Speed

CLUTCHES ENGAGED—80 AND 90

Power is transmitted through the following gears, shafts and clutches: input shaft 16, spur gears 30 and 52, tubular shaft 40, forward directional clutch 80, first countershaft 32, connecting gears 56 and 58, tubular shaft 44, fourth speed clutch 90, second countershaft 34 and thence through universal connection 78 to output shaft 76 in forward direction fourth speed.

Reverse First Speed

CLUTCHES ENGAGED—82 AND 84

Power is transmitted as follows: input shaft 16, spur gears 30, 52 and 54, tubular shaft 46, reverse directional clutch 82, third countershaft 36, spur gears 60, 58 and 62, tubular shaft 50, first speed clutch 84, fourth countershaft 38, spur gears 64 and 66 to second countershaft 34 and thence through universal connection 78 to output shaft 76 in reverse direction first speed.

Reverse Second Speed

CLUTCHES ENGAGED—80 AND 86

Power is transmitted as follows: input shaft 16, spur gears 30, 52 and 54, tubular shaft 46, reverse directional clutch 82, third countershaft 36, second speed clutch 86, tubular shaft 48, spur gears 68 and 70 to second countershaft 34 and thence through universal connection 78 to output shaft 76 in reverse direction second speed.

Reverse Third Speed

CLUTCHES ENGAGED—82 AND 88

Power is transmitted as follows: input shaft 16, spur gears 30, 52 and 54, tubular shaft 46, reverse directional clutch 82, third countershaft 36, connecting gears 60, 58 and 56, first countershaft 32, third speed clutch 88, tubular shaft 42, spur gears 72 and 74 to second countershaft 34 and thence through universal connection 78 to output shaft 76 in reverse direction third speed.

Reverse Fourth Speed

CLUTCHES ENGAGED—82 AND 90

Power is transmitted as follows: input shaft 16, spur gears 30, 52 and 54, tubular shaft 46, reverse directional clutch 82, third countershaft 36, connecting gears 60 and 58, tubular shaft 44, fourth speed clutch 90, second countershaft 34 and thence through universal connection 78 to output shaft 76 in reverse direction fourth speed.

TORQUE CONVERTER AND DIFFERENTIALLY DRIVEN PUMP

Referring to FIGURES 6 and 7, the torque converter generally designated 120 is shown in longitudinal cross section. The differentially driven positive displacement pump 122 is shown mounted on the rear of the torque converter 120. In the construction of FIGURES 6 and 7, the torque converter and differentially driven pump are shown combined in a single structural unit. It will be appreciated that this structure is exemplary only and that other forms of torque converter and differential pump combinations may be utilized to practice the present invention.

The torque converter itself has a power input shaft 124 adapted to be secured to a source of rotary power such as a prime mover electrical motor or internal combustion engine. The power input shaft 124 is formed integrally with a torque converter face plate 125 which has an annular impeller member 126 nonrotatably secured thereto. The torque converter impeller member has a plurality of radially extending blades 128 formed thereon. The power input shaft 124, the face plate 125, and the torque converter impeller member 126 are secured together to rotate as a unit. The torque converter impeller member, being directly driven by the prime mover, rotates at the speed of the prime mover.

The torque converter 120 has a housing 130 formed in several parts which are secured together to form the stationary housing 130. The torque converter housing 130 has an axially extending annular portion 132 which is coaxial with the torque converter power input shaft 124 and the impeller member 126. The portion 132 of the torque converter housing extends axially through the annular impeller member 126. The impeller member 126 is journaled for rotation upon the housing member 132 by means of bearing assembly 134.

Extending axially through the annular portion 132 of the torque converter housing 130 is a torque converter power output shaft 136. Nonrotatably secured to the converter power output shaft 136 is an annular converter turbine member 138 that has a plurality of radially extending turbine blades 140 secured thereto. The bearing assembly 142 rotatably supports the converter output shaft 136 within the stationary housing 130. Another bearing assembly 144 is disposed between the converter power output shaft 136 and the converter face plate 125 so that the converter output shaft is supported to rotate relative to the face plate member 125.

The torque converter 120 has an annular stator member 146 which has a plurality of stator blades 148 extending radially therefrom. The annular stator member 146 is coaxially positioned on and secured to the annular housing portion 132 by an over-running or one way clutch 150. The over-running clutch 150 supporting the stator member is not necessary to practice the present invention, but may be utilized if desired. In lieu of an over-running or one way clutch 150, the stator member may be fixed directly to the annular housing portion 132 so that it may not rotate relative thereto in either direction.

In conventional fashion, the impeller blades 128, the turbine blades 140, and the stator blades 148 are disposed in a toroidal flow circuit defined by the torque converter impeller member 126, turbine member 138, and stator member 146. Upon rotation of the torque converter impeller member, fluid is circulated by the impeller member radially about the toroidal flow circuit to drive the turbine member and to react against the stator member to thereby induce a multiplied torque upon the converter turbine member. This torque converter flow circuit is conventional in all respects.

An annular turbine disc 152 is nonrotatably secured to the torque converter turbine member 138 through a flexible disc support 152a. The relatively flexible disc support 152a permits axial movement of the turbine disc 152 relative to the turbine member 138 but prevents relative rotation between the disc and the turbine member 138. An annular lock-up plate 154 is nonrotatably secured to the torque converter face plate 125 by bolts 155. The lock-up plate 154 and the internal surface of the face plate 125 form an annular chamber in which an annular lock-up piston 156 is disposed. Seal rings 157 form a fluid seal between the surfaces of piston 156, and the face plate 125 and the lock up plate 154 respectively. An annular abutting member 158 is nonrotatably secured to the face plate 125 by bolts 159.

Fluid under pressure may be admitted to the annular chamber behind lock-up piston 156. When fluid is so admitted, piston 156 is forced away from face plate 125 and into contact with the annular turbine disc 152. Turbine disc 152 is moved axially into contact with the annular abutting member 158 nonrotatably secured to the face plate 125. In this manner, the piston 156 and the annular abutting member 158 frictionally engage the turbine disc 152 and lock the torque converter impeller member 126, which is nonrotatably secured to face plate 125, to the torque converter turbine 138 for rotation together as a unit. Such locking action effectively causes the torque converter to become inoperative since the input and output shafts are locked together as a unit rather than being free to rotate relative to each other. When fluid under pressure is vented from the chamber behind piston 156, the impeller member 126 and the turbine member 138 are free to rotate relative to each other and the torque converter is effective to multiply torque in the well known manner.

In order to conduct fluid under pressure to the chamber behind annular piston 156, the lock-up passage 160 is formed in face plate 125. This passage 160 extends radially from a hollow portion 161 in the shaft 124 to the annular space behind annular lock up plate 154. The hollow portion 161 in input shaft 124 communicates with a lock-up passage 162 formed longitudinally in output shaft 136. The passage 162 in shaft 136 communicates with an annular recess 164 formed in converter output shaft 136. A lock-up passage 166 formed in the torque converter stationary housing 130 communicates with the annular recess 164 in shaft 136 so that fluid under pressure may be conducted from the stationary housing 130 into the chamber behind lock-up piston 156. The source of the lock-up fluid and the manner in which it is provided to passage 166 will be discussed at a later point in this specification.

Formed in the stationary converter housing member 130 are an inlet passage 168 and a return passage 170 which are adapted to provide make-up fluid to the torque converter toroidal flow passage. Pressurized fluid is admitted into the inlet passage 168 from whence it passes between the annular housing portion 132 and the torque converter impeller member 126 into the toroidal flow circuit. It is circulated in the toroidal flow circuit to aid in cooling the torque converter and to prevent cavitation within the flow circuit, and then is conducted between the housing portion 132 and the torque converter output shaft 136 into return passage 170. The manner in which passages 168 and 170 are connected in the hydraulic actuating circuit will be discussed at a later point in this specification.

The torque converter housing member 130 has a flanged pump receiving portion 130a extending rearwardly toward the converter output end. Nonrotatably secured to the torque converter housing portion 130a is a generally annular differential pump supporting member 172. Pump supporting member 172 has a horizontally disposed bore 173 formed therein. Bore 173 rotatably receives a differential pump housing member 174 which is supported in bearings 176 and 178 within the supporting member bore 173. The pump housing member 174 has a large gear 180 formed integrally therewith. The housing gear 180 is in meshing relation with a gear 182 that is nonrotatably secured to the transmission output shaft 136. Accordingly whenever the output shaft 136 rotates, the pump housing member 174 rotates at a speed proportional to the speed of the output shaft.

The differential pump housing 174 has a tri-lobular interior recess 184 (best seen in FIGURE 7) which is adapted to receive the three gears 186, 188 and 190 of a three gear positive displacement gear pump. The gears 186, 188 and 190 are journaled to rotate with close clearance in the recess 184 in order to serve as the pumping elements of a three gear gear pump.

A bore 192 is formed in the housing member 174 and is coaxial with gear 186. A shaft 194 is disposed within bore 192 and is nonrotatably secured to the gear 186 of the pump. Shaft 194 is supported in bearings 195 for rotation relative to the housing 174 and the pump supporting member 172.

Since the differential pump housing member 174 rotates relative to the pump supporting member 172, fluid communication between the rotating housing member 174 and the supporting member 172 must be provided to conduct inlet fluid to the pump housing member 174 and to conduct pressurized fluid away from the outlet of pump housing member 174. The actual pressurization of fluid takes place within the tri-lobular recess 184 of the pump housing member 174 between the housing member 174 and gears 186, 188 and 190.

To provide fluid communication between the stationary supporting member 172 and the housing member 174, annular inlet chamber 200 and annular outlet chamber 202 are formed in the surface of housing member 174. These chambers 200 and 202 are in constant communication with inlet passage 204 and outlet passage 206 (not shown in FIGURE 6 but indicated in FIGURE 8) respectively. The passages 204 and 206 are formed in the stationary differential pump supporting member 172. Inlet fluid is conducted through inlet passage 204 in member 172, and into annular chamber 200 formed in housing member 174. Pressurized fluid is conducted from annular outlet chamber 202 into the passage 206 formed in the stationary supporting member 172.

To provide fluid communication between the annular inlet chamber 200 and the annular outlet chamber 202 formed in housing member 174 and the tri-lobular recess 184 of the housing member 174 where fluid pressurization actually takes place, four generally axially extending passages 196, 196a, 198 and 198a are formed in housing member 174. Passages 196 and 196a are inlet passages and communicate with the annular inlet chamber 200 formed in housing member 174. Passages 198 and 198a are outlet passages and communicate with the annular outlet chamber 202 formed in housing member 174. The inlet passages 196 and 196a and the outlet passages 198 and 198a are disposed about the periphery of gear 186 as is best seen in FIGURE 7. In FIGURE 6, the passages 196 and 198 are shown in longitudinal section. Passages 196a and 198a are generally similar to passages 196 and 198 but are not shown in FIGURE 6.

Fluid entering the inlet passage 204 in differential pump supporting member 172 is conducted into the annular inlet chamber 200 formed in housing member 174. It is then conducted through inlet passages 196 and 196a into the tri-lobular recess 184 where it is pressurized due to the relative rotation of housing member 174 and the gears 186, 188 and 190. The pressurized fluid is forced through outlet passages 198 and 198a into the annular outlet chamber 202 formed in housing member 174. From annular outlet chamber 202 the fluid is conducted through the outlet passage 206 formed in the stationary differential pump supporting member 172. Because of this constant fluid communication between the supporting member 172 and the pump housing member 174, the pump inlet and pump outlet conduits which conduct fluid to and from the differential pump structure 122 may be fixedly secured to the pump supporting member 172.

Nonrotatably secured to the shaft 194 disposed within the pump housing member 174 is a drive gear 208. Drive gear 208 is in constantly meshing relation with the annular gear 210 which is nonrotatably secured to the torque converter impeller member 126. With this drive connection consisting of gears 210 and 208, the shaft 194 of the differential pump is driven at a speed proportional to the converter impeller member speed when the impeller member rotates.

OPERATION OF THE TORQUE CONVERTER AND DIFFERENTIAL PUMP

As has already been discussed in part, the torque converter power input shaft 124 is driven by a source of rotary power. The torque converter input shaft in turn drives the impeller member 126 and the gear 210. The torque converter impeller member circulates fluid through the toroidal flow circuit of the torque converter and causes a driving torque to be induced upon the converter turbine member 138. The converter turbine member 138 is driven by this induced torque and it, in turn, drives the torque converter power output shaft 136 that is nonrotatably secured to the turbine member 138. Nonrotatably secured to the power output shaft 136 is a gear 182 which meshes with the gear 180 formed integrally with the differential pump housing. As has already been discussed, so long as there is no pressurized fluid conducted to the chamber behind the lock up piston 156, the torque converter impeller member 126 and turbine member 138 are free to rotate relative to each other to permit torque multiplication through the torque converter. In the event that it is desired to lock out the torque converter so that torque is not multiplied through it, pressurized fluid may be conducted through passage 166, passage 162, passage 160, and into the chamber behind piston 156 to force the piston into contact with the turbine disc 152 and in turn force the turbine disc 152 into contact with the annular abutting member 158.

The gears 182 and 210, nonrotatably secured to the torque converter turbine member 138 and impeller member 126 respectively, drive the two driven elements of the differential pump 122. Gear 182 meshes with the gear 180 integrally formed on the pump housing member 174. Gear 210 meshes with the gear 208 that is nonrotatably secured to the pump gear 186 of the differential pump 122. It will be appreciated that in a conventional three-gear gear pump, the pump housing is stationary and the internal gears are driven to pump fluid through the pump. Thus, the relative motion between the internal gears and the pump housing causes a volumetric quantity of fluid to be pumped through the conventional gear pump.

In the differentially driven positive displacement pump of the present invention, both the pump housing member 174 and the internal gear 186 of the gear pump are driven from an external source. It will be appreciated that so long as these two elements are driven at different angular velocities, there will be relative motion between the two and a volumetric quantity of fluid will be pumped through the pump. If, however, the two driven elements—the housing member 174 and the driven gear 186—are rotating at the same angular velocity, there will be no relative motion between them and no fluid will be pressurized by the pump.

With this principle in mind, the driving gear train consisting of gears 210 and 208 for the internal pump gear 186 has been provided with a different gear ratio than the gear train consisting of gears 182 and 180 which drives the differential pump housing 174. The purpose of making the two gear trains have different gear ratios is to insure that a quantity of fluid is pressurized by the differential pump even though the torque converter turbine member 138 and impeller member 126 are locked together for rotation as a unit. It will be appreciated that the larger pitch diameter of gear 210 as compared to the pitch diameter of gear 182 will cause the shaft 194 to be rotated at a higher angular velocity than the housing member 174 of the differential pump 122 when both gears 182 and 210 are rotated at the same angular velocity.

For the purposes of the present invention it is desired to have the differential pump 122 pressurize a minimum volumetric quantity of fluid even when the torque converter is locked out. Accordingly, the drive trains for the differential pump housing 174 and the internal gear 186 have been constructed in different gear ratios.

The differential pump 122 of the present invention, being a positive displacement pump, pressurizes a volumetric quantity of fluid which is dependent upon the relative speeds of the pump housing member 174 and the internal gear 186. Thus, if the housing member 174 were stationary, and the gear 186 were driven at a maximum speed, a maximum quantity of fluid would be pressurized by the differential pump 122. With the present invention, this maximum condition occurs when the torque converter turbine member 138 is stationary and the torque converter impeller member 126 is rotating at high speed. As is well known in the torque converter art, this condition of the torque converter impeller member rotating at high speed and the turbine member being stationary, as for example when the vehicle to which the torque converter is connected is at rest, coincides with the maximum torque multiplication through the torque converter.

With maximum torque multiplication, it is desirable to have a maximum amount of make-up fluid circulated through the torque converter toroidal flow circuit, and it is desirable to have maximum fluid pressures to engage the clutches of any transmission connected with the torque converter as will be described at a point later in this specification.

When the torque converter impeller member 126 and the torque converter turbine member 138 are rotating at approximately equal speeds, minimum torque is induced upon the torque converter turbine member. Under these conditions, a minimum amount of fluid need be made up to the toroidal flow circuit of the torque converter, and a minimum pressure may be utilized to actuate the clutches of any transmission used in conjunction with the torque converter. In summary of the operation of the torque converter and differential pump, it should be remembered that the torque converter impeller member and turbine member are so drivingly connected to the two driven elements of the differential pump that when the impeller member speed greatly exceeds that of the turbine member speed the differential pump pressurizes a maximum volumetric quantity of fluid. When the torque converter impeller member speed and turbine member speed are nearly equal, the differential pump pressurizes a minimum volumetric quantity of fluid.

THE VARIABLE PRESSURE ACTUATING CIRCUIT

With the foregoing description of the improved transmission mechanism, the torque converter, and the differential pump in mind, the improved variable pressure transmission actuating circuit may be described with particular reference to FIGURE 8 of the drawings. In FIGURE 8 the transmission 10 of FIGURES 1-5 is shown schematically. The torque converter 120 and differential pump 122 of FIGURES 6 and 7 are also shown schematically. The showing of the transmission 10 in FIGURE 8 conforms to the developed longitudinal section of FIGURE 3. The clutches and shafts of the transmission shown in FIGURE 8 occupy the same relative positions in FIGURE 8 as they occupy in FIGURE 3 and have the same reference numerals affixed thereto. The torque converter 120 is shown schematically with the same reference numbers affixed to it in FIGURE 8 as are affixed in FIGURES 6 and 7. In FIGURE 8, the differential pump 122 is also shown schematically and separated from the torque converter 120. However, the differential pump 122 is shown mechanically linked to the torque converter output shaft 136 and the torque converter impeller member 126 to indicate that it is driven by both of these torque converter elements.

As shown in FIGURE 8, the torque converter output shaft 136 is mechanically connected to the transmission input shaft 16. The differential pump 122 is mechanically connected to the torque converter output shaft 136 and the torque converter impeller member 126 and driven by those two members. The torque converter power input shaft 124 is driven by a prime mover 220. The prime mover, in most instances, is unidirectional. Mechanically connected to the transmission output shaft 76 is a reversible positive displacement pump 222 which is an auxiliary pump to supply pressurized fluid for a purpose to be described. The mechanical connection between the transmission output shaft 76 and the pump 222 indicates generally that the pump is driven by the transmission output shaft and there may be reduction gearing between the output shaft and the pump in some instances.

The torque converter input shaft 124 is directly driven by the prime mover 220. The torque converter output shaft 136, which is nonrotatably secured to the converter turbine member 138, directly drives the transmission input shaft 16. As described in connection with FIGURES 1-5 of the drawings, the transmission 10 produces four speed ratios in each direction of its operation. With the torque converter interposed between the engine and the transmission, four additional torque ranges are produced in each direction of transmission operation. Thus when the torque converter is locked up by the engagement of piston 156 with turbine disc 152, the torque converter impeller member 126 and turbine member 138 rotate as a unit and the shafts 124 and 136 of the torque converter rotate at the same angular velocities. In this instance, the transmission 10 has the speed ratios described previously in connection with FIGURES 1-5. When the torque converter is in operation, the piston 156 is withdrawn from the turbine disc 152 and the converter impeller member 126 is driven by the prime mover 124. The turbine member 138 of the torque converter is driven by the kinetic energy of the fluid circulated by impeller member 126 within the toroidal flow circuit. The circulation of the fluid multiplies the torque input to the impeller member 126 and transmits an increased torque to the turbine 138 as has been discussed. When the torque converter is multiplying torque, the turbine member 138 rotates at an angular velocity less than the impeller member 126.

With the torque converter multiplying torque, the power input to the transmission 10 is acted upon by the torque converter and the torque input to the transmission 10 is varied according to the driving conditions encountered. Thus, while the basic transmission speed ratios remain the same as in the previously described case, the action of the torque converter within each speed ratio produces four additional torque ranges in each direction of transmission operation. The significance of the varying torque through the torque converter in each speed ratio in the overall transmission actuating circuit will become apparent as this description proceeds.

*The Transmission Programming Sub-Circuit*

The engagement of the various speed ratios of the basic transmission 10 is accomplished by actuating certain clutches of the transmission 10. These clutches are actuated by pressurized fluid. A transmission programming valve 224 is provided to coordinate the actuation of the clutches of the transmission 10 and to engage the desired speed ratio of the transmission 10. The transmission programming valve 224 shown in FIGURE 8 is exemplary only, and its exact construction forms no part of the present invention. The single programming valve 224 could be replaced by a plurality of individual valves such as is described in detail in the aforementioned Reissue Patent No. 24,327. Further, the transmission programming valve 224 may actually be moved from position to position either manually or by some automatic means. This feature likewise forms no part of the present invention.

In the present instance, the programming valve 224 has a plurality of fluid ports. The pressure inlet port 226 of valve 224 provides for the entry of operating pressure into the programming valve 224. The vent port 228 allows the fluid to be vented as will be described in detail at a later point in this specification. The programming valve 224 also has a forward directional port 230, a reverse directional port 232, a first speed port 234, a second speed port 236, a third speed port 238, and a fourth speed port 240.

The various ports of the transmission programming valve 224 are connected to the corresponding clutches of the transmission 10 through conduits. Thus, the forward directional conduit 242 connects port 230 with clutch 80. The reverse directional conduit 244 connects port 232 with clutch 82. The first speed conduit 246 connects the port 234 with the clutch 84. Second speed conduit 248 connects the port 236 with the clutch 86. The third speed conduit 250 connects the port 238 with the clutch 88. The fourth speed conduit 252 connects the port 240 with the clutch 90.

A vent conduit 254 is connected to the programming valve vent port 228 and communicates, through a pressure relief valve 256, with a fluid reservoir 258 provided for the variable pressure actuating circuit shown in FIGURE 8. Fluid reservoir 258 is shown schematically in FIGURE 8 and is a common return for the various hydraulic sub-circuits shown in FIGURE 8. In actual practice, the fluid reservoir 258 may be contained within a transmission housing 10 or may be a separate unit mounted on the vehicle. Reservoir 258 will be referred to throughout this specification as the various hydraulic sub-circuits are described.

A variable pressure conduit 260 supplies fluid under pressure to the programming valve pressure inlet port 226. While the exact construction of the programming valve 224 is not a critical point in the present invention, the function which it performs should be considered. During all periods when the vehicle prime mover is operating, fluid under pressure is provided to the transmission programming valve 224 through the variable pressure conduit 260. When no speed ratio of the transmission is engaged, the transmission is in a neutral position, and the pressure from conduit 260 is vented to the reservoir 258 through the vent port 228, conduit 254, and pressure relief valve 256. Thus, the neutral position of the programming valve 224 vents the pressurized fluid back to the reservoir. The pressure relief valve 256 is provided in the vent conduit 254 to ensure that the other portions of the hydraulic circuit connected to the variable pressure conduit 260 receive a minimum fluid pressure and are not bled directly to the reservoir through conduit 254. This pressure relief valve 256 may be set at a pressure value sufficient to maintain an operating pressure in the other portions of the circuit.

When the programming valve 224 is moved to a position corresponding to a specific transmission speed ratio, either manually or by some automatic control system as previously discussed, the vent port 228 is closed and the pressurized fluid admitted into the pressure inlet port 226 is directed through the valve simultaneously to two valve outlet ports corresponding to the specific speed of the transmission desired. For example, if it is desired to operate the transmission 10 in the forward direction in first speed, the fluid entering the pressure inlet port 226 of valve 224 is directed by valve 224 to forward directional port 230 and first speed port 234 simultaneously. The pressurized fluid from conduit 260 is then directed through the valve 224 to the corresponding clutches 80 and 84 of the transmission to operate the transmission at forward first speed. In a like manner, the programming valve 224 can be positioned to simultaneously connect the proper conduits to engage the transmission 10 in any of the eight speed ratios enumerated earlier in connection with the description of the basic transmission as shown in FIGURES 1-5.

The variable pressure conduit 260 which provides the pressurized fluid to programming valve 224 communicates at its other end with a four way junction 262. Also communicating with four way junction 262 are the differential pump pressure outlet conduit 263, an auxiliary pressure conduit 266, and a torque converter supply conduit 268. The differential pump pressure outlet conduit 263 contains a check valve 264 which permits flow out of the differential pump 122 but prevents flow through conduit 263 back to the pump outlet.

The Torque Converter Supply Sub-Circuit

The torque converter supply conduit 268, which communicates with junction 262, has a relief valve 270 and an orifice valve 272 disposed therein. The purpose of relief valve 270 and orifice valve 272 will be described in detail at a later point in this specification. For the present, it will suffice to note that under most conditions, pressurized fluid may pass from differential pump pressure outlet conduit 263 through the relief valve 270 and orifice valve 272.

A converter lock up valve 274 is provided to control the flow of fluid through the converter supply conduit 268. The lock-up valve 274 has pressure inlet ports 276 and 278 which receive pressurized fluid from conduit 268. A branch 268a of conduit 268 is provided to admit pressured fluid into the pressure inlet port 276 of lock up valve 274. The lock-up valve 274 also has a pressure outlet port 280, a vent port 282, and an outlet port 284. As shown in FIGURE 8, the converter lock-up valve 274 is a rotary plug valve which has a plug 285. The exact construction of valve 274 forms no part of the present invention and the construction shown and described is by way of example only.

The converter make-up fluid conduit 286 communicates with the valve outlet port 284 and, under certain conditions of operation, conducts pressurized fluid to the torque converter inlet passage 168 to maintain a specified amount of fluid in the toroidal circuit of the torque converter and to aid in cooling the torque converter. A torque converter outlet passage 170 conducts fluid displaced from the torque converter toroidal circuit to the fluid reservoir 258 through a heat exchanger 290, a relief valve 292, and a heat exchanger outlet conduit 294. The converter make-up fluid conduit 286 also has a vent portion which returns pressurized fluid to the hydraulic reservoir 258 through a pressure relief valve 288. Pressure relief valve 288 insures that the pressure conducted to the toroidal flow circuit of the torque converter 120 will not exceed a certain predetermined maximum value for which the relief valve 288 is set. Thus, the pressure in torque converter passage 168 may only reach the maximum value of pressure for which relief valve 288 is set before fluid is no longer forced into the toroidal flow circuit but rather vents directly to the reservoir 258 through relief valve 288.

As has been discussed, providing make-up fluid to an operating torque converter to facilitate cooling of the converter, and to prevent cavitation within the toroidal fluid circuit, is well-known in the torque converter art. The inlet connections from the conduit 286 to the torque converter and the outlet connections to the heat exchanger 290 have been described in detail in connection with FIGURES 6 and 7. The relief valve 292 provides a minimum back pressure in conduit 294 so that the toroidal circuit of the torque converter always has a minimum fluid pressure therein. The heat exchanger 290 facilitates cooling of the heated fluid from the torque converter toroidal flow circuit before that fluid is returned to the fluid reservoir 258.

The converter lock-up valve 274 has a vent conduit 296 communicating with the valve vent port 282. The vent conduit 296 returns fluid to the reservoir 258 under certain conditions of operation as will be described.

The converter lock-up conduit 298 communicates with the lock-up valve outlet port 280 and conducts pressurized fluid to the annular chamber behind pistion 156 of the torque converter through torque converter passage 166.

The valve plug 285 of the conveter lock-up valve 274 has two operating positions. In the operating position shown in full lines in FIGURE 8, the valve plug 285 blocks the pressure inlet port 278 to the valve 274. In allows communication of the pressurized fluid from conduit branch 268a with the converter make-up fluid conduit 286 so that fluid is circulated through the toroidal flow circuit of the torque converter 120. In the position indicated in FIGURE 8, the valve plug 285 also allows communication of the converter lock-up conduit 298 with the vent conduit 296 so that the annular chamber behind piston 156 of the torque converter lock-up unit is vented to the fluid reservoir 258. This releases the torque converter lock-up unit and permits rotation of the torque converter impeller member 126 relative to the torque converter turbine member 138. The full line position of plug 285 in FIGURE 8 represents the torque converter operating position of lock-up valve 274.

The alternate position of plug 285 indicated by the dotted lines 285a in FIGURE 8 is the torque converter lock-up position of the converter lock-up valve 274. In the dotted line position the pressure inlet conduit 268 communicates with the converter lock-up conduit 298 so that pressure is admitted behind the annular lock-up piston 156 of the torque converter to engage the torque converter lock-up unit. When pressure is admitted to the chamber behind piston 156, as described, the torque converter impeller member 126 and a torque converter turbine member 138 are locked together and thye rotate as a unit. In the dotted line position (285a) of the valve 274, all other conduits communicating with valve 274 are made inoperative so that pressure conduit branch 268a is blocked, no pressurized fluid passes into the converter make up fluid conduit 286, and vent conduit 296 is blocked.

The Transmission Actuating Circuit

The differential pump 122 is the primary source of pressurized fluid for the variable pressure transmission actuating circuit. A differential pump inlet conduit 300 is connected to the inlet passage 204 in the differential pump housing. Inlet conduit 300 has a filter 302 attached thereto and is adapted to conduct fluid from the reservoir 258 into the inlet side of the differential pump 122. As has already been described, the differential pump operates when the torque converter rotates and pressurizes a volumetric quantity of fluid. This quantity of fluid is displaced through the outlet passage 206 in the differential pump housing and into the differential pump pressure outlet conduit 263. The pressurized fluid in conduit 263 branches at the junction 262. A portion of the fluid from conduit 263 passes into the torque converter supply conduit 268. Another portion enters the variable pressure conduit 260. The conduit 266 which also communicates with the juncture 262 is adapted to provide auxiliary pressure from the reversible positive displacement pump 222 in a manner to be described. For all practical purposes, conduit 266 may be considered, at this time, to be blocked so that pressure from the conduit 263 does not enter it. Until described in detail, conduit 266 may be considered a one way conduit through which fluid may be conducted to junction 262 but may not be conducted away from junction 262.

When pressurized fluid in the differential pump pressure outlet conduit 263 branches at the junction 262, the relief valve 270 and the orifice valve 272 in conduit 268 produce two effects upon it. Before pressure can pass through the relief valve 270 it must reach a predetermined minimum pressure for which valve 270 is set. Thus, the relief valve 270 insures that the pressure in the variable pressure conduit 260 will be a predetermined minimum before any fluid may flow through the converter supply conduit 268.

Once the pressure in conduit 263 exceeds the minimum value for which the pressure relief valve 270 is set, flow takes place through the converter supply conduit 268. Disposed in the converter supply conduit 268 is a throttle valve or an orifice valve 272. The orifice valve is designed to be initially adjusted and then to remain at a fixed orifice setting. The orifice valve 272 restricts the converter supply conduit 268 so that an orifice effect is created behind the orifice valve 272 to increase the pressure in conduits 263 and 260. In the present construction, the tortuous passages through which the fluid flows in passing through the torque converter toroidal flow passage and thence to the reservoir 258 also tends to increase the orifice effect in the circuit.

In any event, whether produced by an orifice valve such as valve 272, the tortuous passages such as 286 and 168, 170 and 294, or by a combination of both, an orifice effect is created upstream of the orifice valve 272. This orifice effect, as defined earlier, is the effect created by a partial restriction of the conduit 268 which causes the pressure upstream of the conduit 268 or in conduits 263 and 260 to increase as an exponential function of the volumetric rate of flow through the restriction. As has previously been described, the differential pump 122 pressurizes a volumetric quantity of fluid which varies as the relative speeds of the two driven elements of the differential pump vary. Therefore, the volumetric rate of flow through the orifice valve 272 and the tortuous passages 286, 168, 170 and 294, varies with the relative speeds of the two driven members of the differential pump. Accordingly, the pressure in the variable pressure conduit 260 varies as an exponential function of the volumetric quantity of fluid pressurized by the differential varies. For example, when a differential pump pressurizes a minimum volumetric quantity, the pressure in conduit 260 is relatively low. As the differential pump volumetric output increases, the pressure in variable pressure conduit 260 increases approximately as the square of the volumetric output of the differential pump. This increase is due to the orifice effect through the orifice valve 272 and the tortuous fluid flow passages of the converter.

*The Alternate Pressure Sub-Circuit*

An alternate source of fluid pressure for the transmission programming valve 224 is provided by the reversible positive displacement pump 222 drivingly connected to the transmission output shaft 76. Since pump 222 is connected to the transmission output shaft, it is operative during all periods that the vehicle is in motion. Accordingly, if the vehicle were in motion and the prime mover should fail, the pump 126 would provide pressure to actuate the clutches of the transmission 10. Since the pump 222 is drivingly connected to the transmission output shaft, it must be reversible because the transmission output shaft is reversible in direction. The reversible pump 222 is required for safe vehicle operation under certain vehicle operating conditions that will be described in detail when the operation of the variable pressure hydraulic actuating circuit is considered.

The pump 222 is provided with inlet fluid from reservoir 258 through either one of two pump conduits 304 or 306. The pump conduits 304 and 306 are each either the pump inlet or pump outlet conduit depending upon the direction of pump operation. Conduits 304 and 306 are each in communication with one of a pair of parallel conduits 308 and 310. Parallel conduit 308 has check valves 312 and 314 disposed on either side of its juncture with pump conduit 304. In a like manner, parallel conduit 310 has check valves 316 and 318 disposed on either side of its juncture with pump conduit 306. The parallel conduits 308 and 310 come together to form an inlet conduit 320 which communicates with the fluid in the fluid reservoir 258. A filter 322 is provided in inlet conduit 320 to maintain fluid in the actuating circuit as clean as possible.

At their other ends, parallel conduits 308 and 310 join to form pressure conduit 324. Conduit 324 communicates with a pressure inlet port 328 of a pilot valve 326.

The reversible pump 322 rotates with the transmission output shaft. Depending on its direction of rotation, one of the pump conduits 304 and 306 will become the suction conduit to the pump and the other will become the pressure outlet from the pump. For purposes of description, assume the pump 222 to be operating in a direction which makes pump conduit 306 the suction conduit and pump conduit 304 the pressure conduit. In such an event, fluid will be drawn through the conduit 320, check valve 316 and pump conduit 306 into the pump 222. The fluid will be pressurized and passed into pump conduit 304. Pressurized fluid in pump conduit 304 will flow through the check valve 314 into the pressure conduit 324. The check valve 312 in parallel conduit 308 will prevent pressurized fluid from being returned to reservoir 258. The check valve 318 in parallel conduit 310 will prevent pressurized fluid passing through check valve 314 from being pumped in a short circuit back to the pump suction inlet 306. The pressurized fluid in conduit 324 will be conducted to the pressure inlet port 328 of pilot valve 326.

If the pump 222 should be reversed in direction, the pump conduit 304 will become the suction inlet and the pump conduit 306 will become the pump pressure outlet and the auxiliary pressure sub-circuit will function in a manner similar to that just described except that the functions of the parallel conduits will be reversed.

The pilot valve 326 is provided to control the flow of fluid from pressure conduit 324 into the transmission programming valve 224. The pilot valve 326, in addition to the pressure inlet port 328, has a pressure outlet port 330, a vent port 332, and a pilot inlet port 334. The pressure outlet port 330 communicates with the auxiliary pressure conduit 266. The vent port 332 communicates with the vent conduit 254 which returns fluid from the transmission programming valve vent port 228 to the fluid reservoir 258. The pilot inlet port 334 communicates with a pilot conduit 336 to provide an actuating pilot pressure to the pilot valve 326.

The pilot valve 326 is provided to insure that auxiliary fluid pressure from the auxiliary pump 222 is not conducted into the variable pressure conduit 260 while the differential pump 122 is functioning normally. If auxiliary pressure were so conducted, the variable pressure in conduit 260 produced by the orifice effect would be disrupted by the pressure of auxiliary fluid conducted into conduit 260.

The pilot conduit 336 to the pilot valve 326 is in communication with the differential pump pressure outlet conduit 263. The pilot conduit 336 joins the pressure outlet conduit 263 between the outlet passage 206 of the differential pump and the one way check valve 264 in the conduit 263. So long as the differential pump is functioning normally, a pilot pressure is conducted through conduit 336 into the pilot inlet port 334 of the pilot valve 326. This pilot pressure maintains the pilot valve 326 in the vent position. In the vent position, the valve 326 vents the pressure from conduit 324 through the vent outlet port 332 and into vent conduit 254 so that it is returned to the reservoir. In this position, the port 330 of pilot valve 326 is blocked so that no pressure may pass through conduit 226 from the junction 262.

In the event that the differential pump 122 fails to function, there will no longer be a pilot pressure in conduit 336. In such an event, the pilot valve 326 will move to the actuated position so that pressure inlet port 328 communicates directly with pressure outlet port 330 and the vent port 332 is closed. In this event, pressure from the auxiliary pressure conduit 324 will communicate directly with the auxiliary pressure conduit 226 and conduct pressure into the variable pressure conduit 260. The check valve 264 and the differential pump pressure outlet conduit 263 prevents reverse flow of auxiliary pressurized fluid through the differential pump. Auxiliary pressure in conduit 266 enters junction 262. It also is subjected to the orifice effect in torque converter supply conduit 268 and will provide a pressure in variable pressure conduit 260 which increases exponentially as the vehicle speed increases. This is true because the auxiliary pump 222 will pressurize a volumetric quantity of fluid that varies with the speed of the transmission output shaft 76, or the vehicle speed.

OPERATION OF THE VARIABLE PRESSURE HYDRAULIC ACTUATING CIRCUIT

With reference to FIGURE 8, the variable pressure hydraulic actuating circuit may be described as it functions to operate in a vehicle beginning to move from an at rest position. The vehicle prime mover, which for exemplary purposes will be considered an internal combustion engine, will be running at idling speed and turning the impeller member 126 of torque converter 120 through the torque converter power input shaft 124. The transmission mechanism 10 will be in the neutral position so that none of the clutches are engaged to transmit rotary power from the transmission input shaft 16 to the transmission output shaft 76. The torque converter turbine member 138 which is nonrotatably secured to the torque converter output shaft 136 will rotate at a speed slightly less than the speed of the impeller member. The torque converter output shaft 136, which is drivingly connected to the transmission input shaft 16, will rotate the transmission input shaft 16 at the same speed. The differential pump 122, which is drivingly connected to both the torque converter impeller member 126 and a torque converter turbine member 138, will have its two driven elements (housing 174 and gear 186) driven at different angular velocities through the two connecting gear trains so that the differential pump 122 pressurizes a minimum volumetric quantity of fluid. The fluid pressurized by pump 122 will be conducted through the differential pump pressure output conduit 263 to the transmission programming valve 224 and through the torque converter supply conduit 268. The torque converter lock-up valve 274 will be in the position shown in FIGURE 8 so that the torque converter 120 is not locked up and fluid is conducted through the conduit 286 into the torque converter toroidal flow circuit and thence back to the reservoir 258 through conduit 170, heat exchanger 290, and conduit 294. Before fluid can pass into the torque converter lock-up valve 274, the pressure relief valve 270 will insure that there is a minimum predetermined pressure in the variable pressure conduit 260 which supplies operating pressure to the transmission programming valve 224. Under all normal operating conditions, the volumetric quantity of fluid pressurized by pump 122 will be sufficient to create a pressure in conduit 263 which exceeds the relief setting of valve 270 so that fluid will pass into the converter lock-up valve 274.

Because there is pressure in conduit 263, there will be a pilot pressure in pilot conduit 336 which communicates with conduit 263 and the pilot valve 226 will be actuated so that it vents any auxiliary fluid generated by the auxiliary pump 222 back to the reservoir 258 through vent conduit 254. With the vehicle at rest, and the differential pump 122 producing a near minimum volumetric quantity of pressurized fluid, one of the transmission speeds may be selected at the transmission programming valve 224 to engage two of the transmission clutches and initiate movement of the vehicle. For example, the transmission programming valve 224 may be positioned (either automatically or manually) to close the vent port 228 and to permit fluid communication of pressure inlet port 226 simultaneously with the forward directional port 230 and the first speed port 234. In this instance, pressurized fluid will be conducted through conduits 242 and 246 to engage the forward directional clutch 80 and the first speed clutch 84 of transmission 10. The vehicle will now be conditioned to move forward in its first speed ratio with the torque converter actuated.

With transmission clutches 80 and 84 actuated, a driving connection is created between transmission input shaft 16 and transmission output shaft 76. Because the vehicle is initially at rest, transmission output shaft 76 will be stationary and it will stop rotation of transmission input shaft 16, converter output shaft 136, and converter turbine member 138. Because of the fluid connection in the converter toroidal flow circuit, the impeller member 136 and input shaft 124 will continue to rotate at engine idling speed. The vehicle engine 220 will now be accelerated to rotate converter impeller member 126 at near its maximum rotational speed. Since the torque converter turbine member 138 is stationary, and the torque converter impeller member 126 is rotating at high speed, the differential pump 122 will have its two driven elements driven at a high differential speed. Accordingly, the volumetric output from the differential pump 122 will be near a maximum. The increased volumetric output from differential pump 122 will be conducted through conduit 263 and into the torque converter supply conduit 268 and the variable pressure conduit 260 to the transmission programming valve 224. Because of the orifice valve 272 and the tortuous passages through which fluid must pass to enter and leave the torque converter toroidal flow circuit, an orifice effect will be created in the torque converter supply conduit 268. This orifice effect will create increasing pressure in conduits 263 and 260.

As has previously been discussed, the torque converter 120 will be multiplying torque at a maximum value when its impeller member 126 is rotating rapidly and its turbine member 138 is held stationary in a stalled position by the stopped vehicle. Accordingly, the maximum pressure in conduits 263 and 260 will be transferred through the transmission programming valve 224 to actuate the clutches of the transmission when this maximum torque multiplication occurs in the torque converter. At the same time, the torque converter toroidal flow circuit requires its maximum make-up fluid for cooling purposes when the torque converter 120 is producing maximum torque multiplication. Because the volumetric output of the differential pump 122 is a maximum at maximum torque multiplication, a high quantity of fluid will be circulated to the torque converter 120 and through the heat exchanger 290 into reservoir 258.

As the vehicle begins to move, the transmission output shaft 76 will begin to rotate because of the increased torque induced upon the turbine member 138 of the torque converter. Accordingly, the torque converter turbine member 138 will begin to rotate so that the differential in speed between the torque converter impeller member 126 and the torque converter turbine member 138 is reduced somewhat. The volumetric output of fluid pressurized by the differential pump 122 will then begin to decrease and the pressure in conduits 263 and 260 will correspondingly decrease as the vehicle speed increases.

It should be noted that with the vehicle stationary, a relatively low pressure existed in conduits 263 and 260 so that the clutches 80 and 84 were initially engaged at relatively low pressure when the transmission programming valve 224 was positioned to move the transmission from a neutral position. However, once the clutches were engaged, a driving connection was created between the transmission input shaft 16 and the transmission output shaft 76 which, due to the inertia of rest of the vehicle, caused the transmission input shaft 16 and the torque converter turbine member 138 to be stopped until a higher driving torque was induced upon the turbine member to move the vehicle. Accordingly, the clutches were engaged with a relatively low pressure, and then as the torque multiplication through the torque converter increased, the pressure on clutches 80 and 84 increased to insure that it would not slip as the higher torque was transferred through the transmission.

With the vehicle in motion in a forward direction at first speed, the functioning of the actuating circuit may next be considered when the transmission speeds are shifted from one ratio to another. Consider now the condition when the transmission programming valve 224 is positioned to permit communication of the inlet port 226 with the forward directional port 230 and the second speed port 236 simultaneously. When the transmission programming valve 224 is first moved, pressure will be vented from transmission clutch 84 which is the first speed clutch. Accordingly, the driving connection through the transmission will be broken. When the driving connection through the transmission is broken, the torque converter turbine member 138, no longer being directly connected to the transmission output shaft 76 and therefore to the vehicle wheels, will immediately accelerate since there is little load upon it. This acceleration of the turbine 138 will cause the difference in speed between the transmission impeller member 126 and the transmission turbine member 138 to become reduced and a differential pump 122 will pressurize a reduced volumetric quantity of fluid. Accordingly, the pressure in conduits 263 and 260 will drop when clutch 84 is disengaged. The next motion of the programming valve 224 connects the second speed port 236 with the pressure inlet port 226 and clutch 86 is engaged. Since the pressure in conduit 260 has been reduced, the clutch 86 will be engaged with a relatively low pressure. Once the clutch 86 is engaged, the driving connection from the vehicle wheels through the transmission to the torque converter turbine member will be reestablished, a load will be placed on the turbine member, and the differential in speed between the torque converter impeller member 126 and turbine member 138 will increase so that the volumetric quantity of fluid pressurized by the differential pump 122 will increase and the pressure in conduits 263 and 260 will increase thereby increasing the pressure with which clutches 80 and 86 are actuated.

In a like manner, a shifting of the transmission 10 from speed to speed results in a reduction of the clutch actuating pressure produced in the variable pressure conduit 260 when the clutches of the transmission are disengaged. When the clutches are reengaged, the pressure is again increased due to the reestablishment of a higher speed differential between the torque converter impeller member and torque converter turbine member. It will be appreciated that because of the direct relation between torque converter element speeds, the differential pump volumetric output of fluid pressurized, and the torque multiplication through the torque converter, the pressure on the clutches of the transmission is increased when the transmission input torque from the torque converter to the transmission input shaft 16 is increased. When the torque input to the transmission input shaft 16 is reduced, the volumetric output of the differential pump 122 is, at the same time, reduced and the pressure which actuates the clutches of the transmission is reduced. For all eight speed ratios of the transmission which may be engaged with the torque converter 120 in operation, the function of the torque converter and differential pump to modulate the pressure in conduit 260 is as just described.

It will be appreciated that during movement of the vehicle, the different driving conditions encountered will also cause the pressure of the fluid that actuates the transmission clutches to vary as the transmission input torque varies. As an example of this situation, consider the vehicle being driven in a given transmission speed ratio with the torque converter multiplying torque to the transmission input shaft. With the vehicle on level ground and in motion, the converter turbine and impeller members will be rotating with a small differential in speed and the pressure of the fluid actuating the clutches of the transmission will be relatively low. If the vehicle then encounters an up-grade, increased torque will be required to drive the vehicle. The differential in speed between the converter impeller and turbine members will increase automatically to provide an increased torque to the transmission input shaft 16. The increase in speed differential will cause the differential pump 122 to pressurize an increased volumetric quantity of fluid so that the pressure of the fluid that actuates the transmission clutches will increase due to the orifice effect in the actuating circuit. Thus, the increased driving torque transmitted through the transmission mechanism 10 as the vehicle travels up a grade will not cause the transmission clutches to slip since an increased fluid pressure will be provided to the clutches as the input torque to the transmission 10 increases.

The auxiliary pump 222 has important functions in the present transmission actuating circuit. In the event of any malfunction of the differential pump 122, the auxiliary pump 222 supplies pressurized fluid to the transmission programming valve 224 and to the torque converter supply conduit 268 for their operation. Since the auxiliary pump 222 is drivingly connected to the transmission output shaft 76, it pressurizes a volumetric quantity of fluid whenever the transmission output shaft 76 rotates.

Another important function of the pump 222 may appear if the vehicle begins to move down a grade that is steep enough to cause the vehicle to overspeed the prime mover speed. For example, if a heavily loaded vehicle begins moving down a steep grade, the transmission output shaft 76, which is directly drivingly connected to the vehicle wheels, may begin to rotate at such a speed that it forces the torque converter turbine member 138 to rotate at a higher speed than the transmission impeller member 124. Referring for the moment to FIGURE 6, it will be seen that if the turbine member 138 is driven at a speed in excess of the pump impeller member 126, the two elements may reach a particular speed differential, depending upon the relative sizes of gears 182 and 180 and gears 210 and 208, at which the differential pump housing 174 and the differential pump gear 186 will be rotating at the same angular velocity. As seen in FIGURE 6, so long as the impeller member speed is as great or greater than the turbine member speed, the gears 210 and 208 will drive the pump gear 186 at a higher angular velocity than the gears 182 and 180 secured to the turbine member will drive the differential pump housing 174. However, if the turbine speed should be greatly increased over the speed of the impeller member 126, there exists a condition where the two elements 174 and 186 of the differential pump will be driven at the same angular velocity and there will be zero pressurized fluid output from the differential pump. By the same token, if the turbine speed increases very greatly beyond the torque converter impeller speed, the housing 174 of the differential pump may be driven at such a speed that it exceeds the angular velocity of the pump gear 186. In such a situation, the flow of fluid through the differential pump 122 would tend to be reversed.

Referring again to FIGURE 8, it will be seen that the check valve 264 prevents reversal of flow through the differential pump 122. At the same time, the instant that there is no longer fluid pressure in the differential pump output conduit 263, the pilot valve 226 causes fluid from the auxiliary pump 222 to be conducted into junction 262 from whence it is utilized to supply fluid pressure to the transmission programming valve 224 and to the torque converter supply conduit 268.

As has previously been discussed, the torque converter 120 may be locked out so that it does not multiply torque. In order to lock out the torque converter, the torque converter lock-up valve 274 is positioned so that fluid passes from conduit 268 into the lock-up conduit 298 and actuates the converter lock-up unit by moving the annular piston 156 into contact with the turbine disc 152 (FIGURE 6). When the torque 120 is locked up, the torque converter power input shaft 124 and the torque converter output shaft 136 rotate as a unit and there is no torque multiplication through the torque converter. With the torque converter so locked up, the differential pump 122 has a fixed ratio drive which connects the pump housing member to the torque converter turbine member and the pump gear to the torque converter impeller member. Accordingly, since the relative speeds of the torque converter turbine member 138 and torque converter impeller member 126 are fixed, the ratio between the two driven elements of the differential pump is fixed. The differential pump 122 then pressurizes its minimum volume of fluid which remains constant and causes the pressure in conduits 263 and 260 to remain constant at a minimum value. This minimum value is sufficient to maintain the clutches of the transmission in an engaged position when the prime mover 220 drives the transmission input shaft 16 directly without multiplication of the input torque by the torque converter 120.

It will be seen that the improved transmission actuating circuit of the present invention provides for the initial actuation of clutches of the transmission at a pressure great enough to maintain them in the engaged position and, if the torque input to the transmission is increased, the pressure to the clutches of the transmission is correspondingly increased.

The present actuating circuit also controls the volumetric quantity of fluid circulated through the toroidal flow circuit of the hydro-kinetic torque converter so that the maximum quantity of fluid is so circulated when maximum torque multiplication is taking place in the torque converter. Various pressure relief valves are provided to insure that there is always a minimum pressure conducted to the transmission clutches. Further, relief valves are provided to insure that the pressure conducted to the torque converter toroidal flow circuit does not exceed a maximum value, and to insure that the back pressure in the toroidal flow circuit does not fall below a minimum value.

According to the provisions of the patent statutes, we have explained the principle, preferred construction and mode of operation of our invention and have described what we now consider to represent its best embodiment. However, we desire to have it understood that, within the scope of the appended claims, the invention may be practiced otherwise than as specifically illustrated and described.

We claim:

1. The combination comprising a transmission mechanism having four speeds in both forward and reverse direction, said transmission mechanism including a transmission housing, four countershafts arranged in parallel spaced relation to each other within said housing and adapted to rotate in both directions, constant mesh gearing including a pair of directional gears, four connecting gears and a plurality of change speed gears, a pair of said connecting gears secured to and rotatable with a pair of said countershafts, said other pair of connecting gears coaxially positioned on and rotatable relative to said other pair of countershafts, said connecting gears arranged in driving relation with each other, a pair of directional clutches, and four change speed clutches, each of said clutches operable to be engaged when pressurized fluid is conducted thereto, said directional clutches adapted upon selective engagement to transmit rotation of said directional gears to said connecting gears in a predetermined direction, said change speed clutches arranged upon selective engagement to transmit rotation of said connecting gears to another of said countershafts at a predetermined selected speed, two of said change speed clutches arranged to selectively connect said other pair of connecting gears to said respective countershafts extending coaxially therethrough, said gearing including a pair of gears nonrotatably secured to a pair of said countershafts and meshing with each other to drivingly connect said countershafts to each other, a source of pressurized fluid, conduit means operable to connect said source of pressurized fluid to each of said clutches, transmission programming means associated with said conduit means and positionable to direct pressurized fluid through said conduit means from said source to said clutches, and means to vary the pressure of said fluid being conducted to said clutches from said source as the input torque to said transmission mechanism varies.

2. The combination comprising a torque converter including an impeller member and a turbine member, a transmission mechanism having four speeds in both forward and reverse direction, said transmission mechanism including a transmission housing, four countershafts arranged in parallel spaced relation to each other within said housing and adapted to rotate in both directions, constant mesh gearing including a pair of directional gears, four connecting gears and a plurality of change speed gears, a pair of said connecting gears secured to and rotatable with a pair of said countershafts, said other pair of connecting gears coaxially positioned on and rotatable relative to said other pair of countershafts, said connecting gears arranged in driving relation with each other, a pair of directional clutches, and four change speed clutches, each of said clutches operable to be engaged when pressurized fluid is conducted thereto, said directional clutches adapted upon selective engagement to transmit rotation of said directional gears to said connecting gears in a predetermined direction, said change speed clutches arranged upon selective engagement to transmit rotation of said connecting gears to another of said countershafts at a predetermined selected speed, two of said change speed clutches arranged to selectively connect said other pair of connecting gears to said respective countershafts extending coaxially therethrough, said gearing including a pair of gears nonrotatably secured to a pair of said countershafts and meshing with each other to drivingly connect said countershafts to each other, said transmission mechanism being drivingly connected to said torque converter turbine member, a differentially driven positive displacement pump including first and second relatively rotatable driven members, said differentially driven pump operable to pressurize a volumetric quantity of fluid upon relative rotation of said pump driven members and to vary said volumetric quantity of fluid pressurized by said differentially driven pump with the differential in speed between said pump driven members, first fixed ratio driven means drivingly connecting said torque converter impeller member to said pump first driven member, second fixed ratio drive means drivingly connecting said torque converter turbine member to said pump second driven member, conduit means adapted to conduct pressurized fluid from said differentially driven pump to said transmission clutches, and orifice means associated with said conduit means, said orifice means adapted to vary the pressure of fluid conducted to said clutches as said volumetric quantity of fluid pressurized by said differentially driven pump varies.

3. In a transmission mechanism having four speeds in both forward and reverse direction the combination comprising a transmission housing, four countershafts arranged in parallel spaced relation to each other within said housing and adapted to rotate in both directions, constant mesh gearing including a pair of directional gears, four connecting gears and a plurality of change speed gears, a pair of said connecting gears secured to and rotatable with a pair of said countershafts, said other pair of connecting gears coaxially positioned on and rotatable relative to said other pair of countershafts, said connecting gears arranged in driving relation with each other, a pair of directional clutches, four change speed clutches, said directional clutches adapted upon selective engagement to transmit rotation of said directional gears to said connecting gears in a predetermined direction, said change speed clutches arranged upon selective engagement to transmit rotation of said connecting gears to another of said countershafts at a predetermined selected speed, two of said change speed clutches arranged to selectively connect said other pair of connecting gears to said respective countershafts extending coaxially therethrough, and said gearing including a pair of gears nonrotatably secured to a pair of said countershafts and meshing with each other to drivingly connect said countershafts to each other.

4. In a transmission as set forth in claim 3 which includes a first tubular shaft coaxially positioned on and rotatable relative to one of said countershafts, a second tubular shaft coaxially positioned on and rotatable relative to another countershaft, one of said other pairs of connecting gears secured to and rotatable with said first tubular shaft, and the second of said other pairs of connecting gears secured to and rotatable with said second tubular shaft, said first and second of said other pairs of connecting gears meshing with each other.

5. In a transmission as set forth in claim 4 in which said gearing includes a spur gear nonrotatably secured to one of said countershafts and another spur gear nonrotatably secured to another countershaft, said spur gears meshing with each other so that rotation of said last named countershaft is transmitted directly to said first named countershaft.

6. In a constant mesh transmission having four speeds in both forward and reverse direction the combination comprising a transmission housing, a first countershaft, a second countershaft, a third countershaft, and a fourth countershaft, all of said countershafts arranged in parallel spaced relation to each other, first and second tubular shafts coaxially positioned on said first countershaft in rotatable relation thereto, a third tubular shaft coaxially positioned on said second countershaft in rotatable relation thereto, fourth and fifth tubular shafts coaxially positioned on said third countershaft in rotatable relation thereto, a sixth tubular shaft coaxially positioned on said fourth countershaft in rotatable relation thereto, said first, second and third countershafts having their end portions projecting from said housing, said fourth countershaft having an end portion projecting from said housing, said tubular shafts having portions projecting from said housing, an input shaft journaled in said housing, a first spur gear secured to and rotatable with said input shaft, a first directional gear secured to and rotatable with said first tubular shaft, said first directional gear meshing with and driven by said first spur gear, a second directional gear secured to and rotatable with said fourth tubular shaft, said second directional gear meshing with and driven by said first directional gear, a first connecting gear secured to and rotatable with said first countershaft, a second connecting gear secured to and rotatable with said third tubular shaft, said second connecting gear meshing with said first connecting gear, a third connecting gear secured to and rotatable with said third countershaft, said third connecting gear meshing with said second connecting gear, a fourth connecting gear secured to and rotatable with said sixth tubular shaft, said fourth connecting gear meshing with said second connecting gear, a first change speed gear secured to and rotatable with said fourth countershaft, a second spur gear secured to and rotatable with said second countershaft, said first change speed gear meshing with said second spur gear, a second change speed gear secured to said fifth tubular shaft, a third spur gear secured to and rotatable with said second countershaft, said second change speed gear meshing with said third spur gear, a third change speed gear secured to and rotatable with said second tubular shaft, a fourth spur gear secured to and rotatable with said second countershaft, said third change speed gear meshing with said fourth spur gear, output means connected to and driven by said second countershaft, a forward directional clutch arranged to frictionally engage said first tubular shaft to said first countershaft, a reverse directional clutch arranged to engage said fourth tubular shaft to said third countershaft, a first change speed clutch arranged to frictionally engage said sixth tubular shaft to said fourth countershaft, a second change speed clutch arranged to frictionally engage said fifth tubular shaft to said third countershaft, a third change speed clutch arranged to frictionally engage said second tubular shaft to said first countershaft, and a fourth change speed clutch arranged to frictionally engage said third tubular shaft to said second countershaft, said directional clutches and said change speed clutches positioned exteriorly of said housing, said directional clutches adapted upon selective engagement to rotate said connecting gears, said first and third countershafts and said third and sixth tubular shafts in a given direction, said change speed clutches arranged upon selective engagement to rotate said second countershaft and said output means at a predetermined selected speed.

7. The combination comprising a torque converter including a power input shaft and a power output shaft, a differentially driven positive displacement pump including first and second relatively rotatable driven members, said differentially driven pump operable to pressurize a volumetric quantity of fluid upon relative rotation of said pump driven members, said volumetric quantity of fluid pressurized by said differentially driven pump varying with the differential in speed between said pump driven members, first fixed ratio drive means drivingly connecting said torque converter power input shaft to said pump first driven member, second fixed ratio drive means drivingly connecting said torque converter power output shaft to said pump second driven member, conduit means adapted to conduct pressurized fluid from said differentially driven pump to a plurality of pressurized fluid actuated mechanisms, and orifice means associated with said conduit means, said orifice means operable to vary the pressure of fluid being conducted to said mechanisms as said volumetric quantity of fluid pressurized by said differentially driven pump varies.

8. The combination comprising a hydro-kinetic torque converter including an impeller member, a turbine member, a stator member, and a converter lock up unit operable to engage said impeller member and said turbine member for rotation together when pressurized fluid is conducted to said lock-up unit, a differentially driven positive displacement pump including first and second relatively rotatable driven members, said differentially driven pump operable to pressurize a volumetric quantity of fluid upon relative rotation of said pump driven members, said volumetric quantity of fluid pressurized by said pump varying with the differential in speed between said pump driven members, a first gear train drivingly connecting said torque converter impeller member to said pump first driven member at a first fixed speed ratio, a second gear train drivingly connecting said torque converter turbine member to said pump second driven member at a second fixed speed ratio different from said first fixed speed ratio, said first and second gear trains adapted to provide relative rotation between said pump first and second driven members when said torque converter lock-up unit engages said converter turbine member to said converter impeller member for rotation together, conduit means adapted to conduct pressurized fluid from said differentially driven pump to said converter lock-up unit and to a plurality of pressurized fluid actuated mechanisms, and orifice means associated with said conduit means, said orifice means operable to vary the pressure of fluid conducted to said mechanisms as said volumetric quantity of fluid pressurized by said differentially driven pump varies.

9. The combination comprising a hydro-kinetic torque converter including an impeller member, a turbine member, a stator member, and a converter lock-up unit operable to engage said impeller member and said turbine member for rotation together when pressurized fluid is conducted to said lock-up unit, portions of said impeller member, turbine member and stator member being arranged in a toroidal fluid circuit wherein said impeller member is operable to circulate fluid through said toroidal fluid circuit, a differentially driven positive displacement pump including first and second relatively rotatable driven members, said differentially driven pump operable to pressurize a volumetric quantity of fluid upon relative rotation of said pump driven members, said volumetric quantity of fluid pressurized by said pump varying with the differential in speed between said pump driven members, a first gear train drivingly connecting said torque converter impeller member to said pump first driven member at a first fixed speed ratio, a second gear train drivingly connecting said torque converter turbine member to said pump second driven member at a second fixed speed ratio different from said first fixed speed ratio, said first and second gear trains adapted to provide relative rotation between said pump first and second driven members when said torque converter lock-up unit engages said converter turbine member to said impeller member for rotation together, conduit means adapted to conduct pressurized fluid from said differentially driven pump to said torque converter toroidal fluid circuit and to a plurality of pressurized fluid actuated mechanisms, and orifice means associated with said conduit means, said orifice means operable to vary the pressure of fluid conducted to said mechanisms as said volumetric quantity of fluid pressurized by said differentially driven pump varies.

10. The combination comprising a transmission mechanism having an input shaft and a plurality of gears and shafts operable to be drivingly connected to said input shaft through a plurality of clutches, said clutches selectively engageable to effect a plurality of transmission speed ratios, each of said clutches operable to be engaged when pressurized fluid is conducted thereto, variable torque drive means connected to said transmission input shaft to drive said transmission, a source of pressurized fluid having a volumetric output varying with variations in the torque output of said variable torque drive means, conduit means operable to join said source of pressurized fluid to each of said clutches, transmission programming means associated with said conduit means and positionable to direct pressurized fluid through said conduit means from said source to said clutches, and orifice means associated with said conduit means to vary the pressure of fluid being conducted to said clutches from said source as said source volumetric output varies.

11. The combination comprising a torque converter including power input shaft and a power output shaft, a transmission mechanism including a plurality of gears and shafts operable to be drivingly connected through a plurality of clutches, said clutches selectively engageable to effect a plurality of transmission speed ratios, each of said clutches operable to be engaged when pressurized fluid is conducted thereto, said transmission mechanism being drivingly connected to said torque converter power output shaft, a differentially driven positive displacement pump including first and second relatively rotatable driven members, said differentially driven pump operable to pressurize a volumetric quantity of fluid upon relative rotation of said pump driven members, said volumetric quantity of fluid pressurized by said differentially driven pump varying with the differential in speed between said pump driven members, first fixed ratio drive means drivingly connecting said torque converter power input shaft to said pump first driven member, second fixed ratio drive means drivingly connecting said torque converter power output shaft to said pump second driven member, conduit means adapted to conduct pressurized fluid from said differentially driven pump to said transmission clutches, and orifice means associated with said conduit means, said orifice means operable to vary the pressure of fluid conducted to said clutches as said volumetric quantity of fluid pressurized by said differentially driven pump varies.

12. The combination comprising a hydro-kinetic torque converter including an impeller member, a turbine member, a stator member, and a converter lock-up unit operable to engage said impeller member and said turbine member for rotation together when pressurized fluid is conducted to said lock-up unit, a transmission mechanism driven by said converter turbine member and having a plurality of gears and shafts including input and output shafts operable to be drivingly connected through a forward directional clutch, a reverse directional clutch, a first speed clutch, a second speed clutch, a third speed clutch, and a fourth speed clutch, said clutches engageable to effect four transmission speeds in each direction of operation, each of said clutches operable to be engaged when pressurized fluid is conducted thereto, each of said transmission speeds being effected by the simultaneous engagement of one directional clutch and one speed clutch, a transmission programming valve having a pressurized fluid inlet, a vent outlet, and clutch outlets corresponding to each of said transmission clutches, a forward directional conduit connecting one of said valve outlets to said forward directional clutch, a reverse directional conduit connecting another of said valve outlets to said reverse directional clutch, a first speed conduit connecting another of said valve outlets to said first speed clutch, a second speed outlet connecting another of said valve outlets to said second speed clutch, a third speed conduit connecting another of said valve outlets to said third speed clutch, and a fourth speed conduit connecting another of said valve outlets to said fourth speed clutch, said programming valve positionable to simultaneously connect said pressurized fluid inlet to one of said directional conduits and one of said speed conduits, a differentially driven positive displacement pump including first and second relatively rotatable driven members, said differentially driven pump operable to pressurize a volumetric quantity of fluid upon relative rotation of said pump driven members, said volumetric quantity of fluid pressurized by said pump varying with the differential in speed between said pump driven members, a first gear train drivingly connecting said torque converter impeller member to said pump first driven member at a first fixed speed ratio, a second gear train drivingly connecting said torque converter turbine member to said pump second driven member at a second fixed speed ratio different from said first fixed speed ratio, said first and second gear trains adapted to provide relative rotation between said pump first and second driven members when said torque converter lock up unit engages said converter turbine member to said impeller member for rotation together, a differential pump pressure outlet conduit secured at one end to the outlet of said differential pump, said differential pump outlet conduit communicating at its other end with a variable pressure conduit and a torque converter supply conduit, said variable pressure conduit connecting said differential pump pressure output conduit to said transmission programming valve inlet, a torque converter lock-up valve positionable to admit pressurized fluid to said converter lock-up unit or to vent said unit, said torque converter supply conduit connecting said differential pump pressure outlet conduit to said torque converter lock-up valve, a converter lock-up conduit connecting said converter lock-up valve and said converter lock-up unit, an orifice valve disposed in said torque converter supply conduit to restrict said torque converter supply conduit, an alternate source of pressurized fluid, said alternate source adapted to deliver pressurized fluid into said variable pressure conduit and said torque converter supply conduit when there is no pressurized fluid in said differential pump outlet conduit, said orifice valve operable to vary the pressure of fluid conducted to said transmission programming valve through said variable pressure conduit as said volumetric quantity of fluid pressurized by said differentially driven pump varies.

13. The combination of claim 12 wherein said alternate source of pressurized fluid includes a reversible positive displacement pump drivingly connected to the output shaft of said transmission mechanism.

14. The combination comprising a torque converter, a transmission mechanism having an input shaft driven by said torque converter, an output shaft, and a plurality of gears and shafts operable to drivingly connect said transmission input shaft to said transmission output shaft through a plurality of clutches, said clutches being selectively engageable to effect a plurality of transmission speed ratios, each of said clutches operable to be engaged when pressurized fluid is conducted thereto, a source of pressurized fluid, conduit means operable to conduct fluid from said source to each of said clutches, transmission programming means associated with said conduit means and positionable to shift said transmission mechanism from one speed ratio to another by directing pressurized fluid through said conduit means from said source to selected ones of said clutches, said programming means arranged to cause the driving connection through said transmission mechanism to be broken as said transmission mechanism is shifted from one speed ratio to another, and means associated with said torque converter to reduce the pressure of fluid being conducted to said clutches when said driving connection is broken as said transmission mechanism is shifted from one speed ratio to another, and to thereafter increase the pressure of fluid being conducted to said clutches in accordance with the increased torque input to said transmission mechanism from said torque converter upon reestablishment of said driving connection through said transmission.

References Cited in the file of this patent
UNITED STATES PATENTS

| | | |
|---|---|---|
| 2,887,198 | Hobbs | May 19, 1959 |
| 2,910,942 | Thorman | Nov. 3, 1959 |
| 2,928,295 | Boulanger | Mar. 15, 1960 |
| 2,946,241 | Snyder | July 26, 1960 |